US009525793B2

United States Patent
Hasegawa

(10) Patent No.: US 9,525,793 B2
(45) Date of Patent: Dec. 20, 2016

(54) IMAGING DEVICE FOR IMAGING PAGES OF BOOK, METHOD THEREFOR, AND RECORDING MEDIUM

(71) Applicant: CASIO COMPUTER CO., LTD., Tokyo (JP)

(72) Inventor: Hirokazu Hasegawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/836,025

(22) Filed: Aug. 26, 2015

(65) Prior Publication Data
US 2016/0080597 A1   Mar. 17, 2016

(30) Foreign Application Priority Data
Sep. 12, 2014   (JP) ................ 2014-186111

(51) Int. Cl.
| | | |
|---|---|---|
| G03G 15/00 | (2006.01) | |
| G03B 27/32 | (2006.01) | |
| H04N 1/00 | (2006.01) | |
| H04N 1/387 | (2006.01) | |
| H04N 1/393 | (2006.01) | |

(52) U.S. Cl.
CPC ........ *H04N 1/00822* (2013.01); *H04N 1/0066* (2013.01); *H04N 1/00811* (2013.01); *H04N 1/3876* (2013.01); *H04N 1/393* (2013.01)

(58) Field of Classification Search
CPC .................... G03G 15/302; G03G 2215/00282
USPC ..................... 399/362; 355/25, 82
See application file for complete search history.

(56) References Cited

U.S. PATENT DOCUMENTS

| | | | |
|---|---|---|---|
| 5,301,262 A | | 4/1994 | Kashiwagi |
| 6,055,036 A | * | 4/2000 | Takahashi |
| 6,075,624 A | * | 6/2000 | Bannai |
| 2010/0067068 A1 | | 3/2010 | Jeong et al. |
| 2012/0019863 A1 | * | 1/2012 | Sensu |
| 2012/0105888 A1 | | 5/2012 | Nakayama |

(Continued)

FOREIGN PATENT DOCUMENTS

| | | |
|---|---|---|
| JP | H07-110528 A | 4/1995 |
| JP | H07-271808 A | 10/1995 |

(Continued)

OTHER PUBLICATIONS

Japanese Office Action dated Sep. 13, 2016, in a counterpart Japanese patent application No. 2014-186111. (A machine translation (not reviewed for accuracy) attached.).

*Primary Examiner* — Walter L Lindsay, Jr.
*Assistant Examiner* — Milton Gonzalez
(74) *Attorney, Agent, or Firm* — Chen Yoshimura LLP

(57) ABSTRACT

An imaging device includes: an imaging unit that captures page images; an operation unit configured to receives a command from outside to select a left page imaging mode in which left page images among the page images are sequentially captured in accordance with page turning, and a command from outside to select a right page imaging mode in which right page images among the page images are sequentially captured in accordance with page turning; a control unit that causes the imaging unit to perform imaging of the page images that correspond to the imaging mode selected via the operation unit; and an output unit that outputs the page images captured by the imaging unit.

11 Claims, 21 Drawing Sheets

(56) References Cited

U.S. PATENT DOCUMENTS

2014/0078561 A1    3/2014   Hasegawa
2014/0168726 A1    6/2014   Hasegawa
2014/0177011 A1    6/2014   Hasegawa

FOREIGN PATENT DOCUMENTS

| JP | H11-164102 A | 6/1999 |
| JP | 2004-260851 A | 9/2004 |
| JP | 2010-028510 A | 2/2010 |
| JP | 2010-511347 A | 4/2010 |
| JP | 2012-096434 A | 5/2012 |
| JP | 2012-160821 A | 8/2012 |
| JP | 2014-061619 A | 4/2014 |
| JP | 2014-117893 A | 6/2014 |
| JP | 2014-140146 A | 7/2014 |
| WO | 2008/066291 A1 | 6/2008 |

\* cited by examiner

| Left Page Numbers |
|---|
| Left-Front-0000 ~ |
| Left-Middle-0000 ~ |
| Left-Back-0000 ~ |
| Left-Retake-0000 ~ |

| Right Page Numbers |
|---|
| Right-Front-0000 ~ |
| Right-Middle-0000 ~ |
| Right-Back-0000 ~ |
| Right-Retake-0000 ~ |

IMAGING DEVICE FOR IMAGING PAGES OF BOOK, METHOD THEREFOR, AND RECORDING MEDIUM

BACKGROUND OF THE INVENTION

Field of the Invention

The present invention relates to an imaging device for imaging the pages of a book, a method therefor, and a recording medium.

Description of Related Art

A conventional page turning device separates the overlapping pages of a book or the like one-by-one, individually images each page that has been flipped, and then performs image processing to digitize the page.

There is technology that realizes this page turning operation in a single action, thereby hastening the speed of the page turning.

There is also technology that prevents the turned page from returning to page-turn origin from page-turn destination, thereby enhancing reliability of the page turning itself.

This gives rise to demand for tools for page turning devices that can make combining the pages easier, such as by having the captured images of the book being ordered by page, for example.

SUMMARY OF THE INVENTION

Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an imaging device, including: an imaging unit that captures page images; an operation unit configured to receives a command from outside to select a left page imaging mode whereby left page images among the page images are sequentially captured in accordance with page turning, and a command from outside to select a right page imaging mode whereby right page images among the page images are sequentially captured in accordance with page turning; a control unit that causes the imaging unit to perform imaging of the page images that correspond to the imaging mode selected via the operation unit; and an output unit that outputs the page images captured by the imaging unit.

In another aspect, the present disclosure provides a method of imaging pages of a book, including: receiving, by an operation unit, a command from outside to select a left page imaging mode whereby left page images among page images are sequentially captured in accordance with page turning, or a command from outside to select a right page imaging mode whereby right page images among the page images are sequentially captured in accordance with page turning; causing an imaging device to perform imaging of the page images that correspond to the imaging mode selected via the operation unit; and outputting the page images captured by the imaging unit.

In another aspect, the present disclosure provides a non-transitory computer-readable storage medium having stored therein a program executable by a processor that controls a device for imaging pages of a book, the program causing the processor to perform the following: receiving, by an operation unit, a command from outside to select a left page imaging mode whereby left page images among page images are sequentially captured in accordance with page turning, or a command from outside to select a right page imaging mode whereby right page images among the page images are sequentially captured in accordance with page turning; causing an imaging device to perform imaging of the page images that correspond to the imaging mode selected via the operation unit; and outputting the page images captured by the imaging unit.

It is to be understood that both the foregoing general description and the following detailed description are exemplary and explanatory, and are intended to provide further explanation of the invention as claimed.

BRIEF DESCRIPTION OF THE DRAWINGS

A deeper understanding of the present invention can be obtained by referring to the drawings described below alongside the detailed descriptions given later.

DETAILED DESCRIPTION OF EMBODIMENTS

Figure 1:
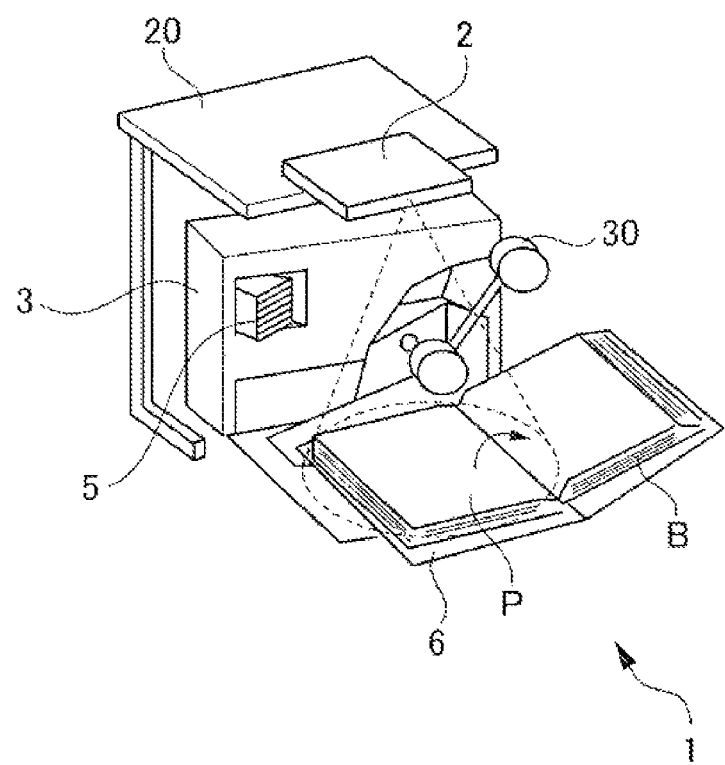
FIG. 1 is a perspective view showing a schematic configuration of a document camera system that uses the imaging device according to one embodiment of the present invention.

An imaging device according to one embodiment of the present invention (hereinafter, "the present embodiment") will be explained in detail below. In the following explanation of the present embodiment, the same reference characters are given to the same elements throughout.

Configuration of Embodiment

FIG. 1 is a view for explaining the configuration of primary components of a document camera system that uses an imaging device (tablet 2) according to the present embodiment. In the following explanation, a situation will be described in which the pages P of the book B are turned from left to right, as shown by the arrow in the drawing.

As shown in FIG. 1, the document camera system 1 includes a tablet 2 having an imaging unit that images the respective pages P of the book B, and a page turning device 3 that turns the pages P of the book B.

The tablet 2 and the page turning device 3 are connected to communicate with each other by using a near field wireless communication adapter such as Bluetooth (registered trademark) or Wi-Fi (registered trademark) embedded respectively therein.

The tablet 2 is placed on a stand 20, and a camera (imaging unit) mounted on the back of the tablet 2 faces the book B such that the book B fits within the angles of view of the camera. This makes it possible to focus on and image the left page or right page of the book.

The page turning device 3 includes a holding base 6 that holds the opened book B, a turning mechanism 30 that holds the page P on the holding base 6 at page-turn origin and releases the page at page-turn destination, a vent 5 that causes air to pass above the page P at page-turn origin in order to blow the page P at page-turn destination, and a control unit (not shown).

It should be noted that an application regarding the page turning device 3 was submitted by the same applicant as the present application, the details of which are described in Japanese Patent Application Laid-Open Publication No. 2014-117893, and thus repetitious explanations thereof will be omitted here.

Figure 2:
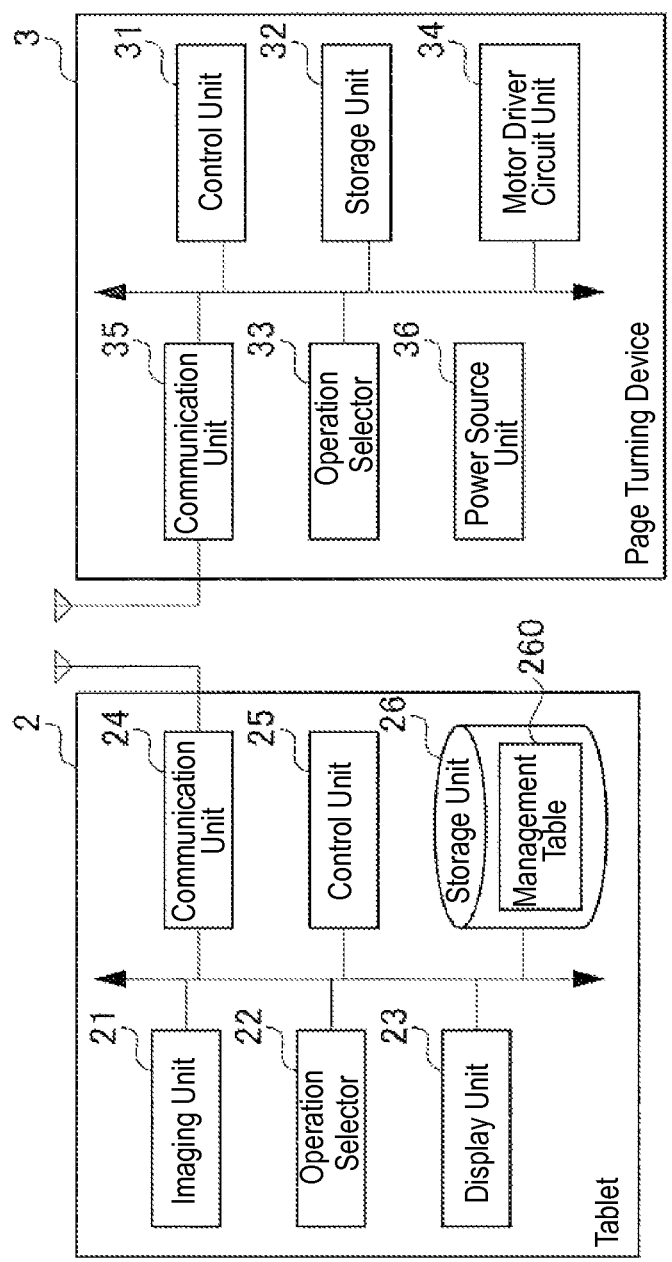
FIG. 2 is a block view of a configuration of the control system of the document camera system in FIG. 1.

FIG. 2 is a block view of the tablet 2 and the control configuration of the page turning device 3, which form a portion of the document camera system 1.

As shown in FIG. 2, the tablet 2 includes an imaging unit 21, operation unit 22, display unit 23, communication unit 24, control unit 25, and storage unit 26.

The imaging unit 21 is a camera that can capture page images of the book B or the like, and has, in addition to an optical system including a lens, an imaging device formed by a CCD (charge coupled device), CMOS (complementary metal oxide semiconductor), or the like. Analog image signals photoelectrically converted by this imaging device undergo gain adjustment for each color component and color separation, and are then converted to digital data, which undergoes demosaicing and is displayed on a display unit 23 having a display unit such as an LCD (liquid crystal display) or organic EL (electroluminescent) monitor, for example.

The operation unit 22 can be used to switch between two modes: a left page imaging mode for sequentially imaging the left page images in accordance with the page turning, and a right page imaging mode for sequentially imaging the right page images in accordance with the page turning.

The control unit 25 causes the imaging unit 21 to capture page images that correspond to the imaging mode selected by the operation unit 22.

The display unit 23 displays (outputs) the display image that has been captured by the imaging unit 21. The page image captured by the imaging unit 21 may be output to the communication unit 24 or the storage unit 26.

Accordingly, the display unit 23, the communication unit 24, or the storage unit 26 functions as an output unit. It should be noted that the operation unit 22 and the display unit 23 are integrally used as a touch panel in which the operation unit 22 is formed on the display surface of the display unit 23.

Furthermore, the operation unit 22 can select between a left page manual imaging mode for manually imaging the left page images and a right page manual imaging mode for manually imaging the right page images. When the page imaging mode is set as the left page manual imaging mode, the control unit 25 sets the captured page images as left page images, and when the page imaging mode is set as the right page manual imaging mode, the control unit 25 sets the captured page images as right page images.

Moreover, the operation unit 22 also makes it possible to input an anticipated page number corresponding to the page image. The anticipated page number will be explained later.

The operation unit 22 makes it possible to select between a left page anticipated page number creation mode whereby an anticipated page number that is input to one of the left page images is used as a reference and anticipated page numbers are created for all remaining left page images, and a right page anticipated page number creation mode whereby an anticipated page number that is input to one of the right page images is used as a reference and anticipated page numbers are created for all remaining right page images. When this type of mode is executed, the control unit 25 creates anticipated page numbers for all of the remaining left or right page images in accordance with the anticipated page number creation mode that has been selected. As explained later, this anticipated page number is output to the display unit 23 along with the page image.

The operation unit 22 can also select between a left page inversion mode whereby the vertical relationship can be inverted by rotating the left page image 180°, and a right page inversion mode whereby the vertical relationship can be inverted by rotating the right page image 180°. When this type of mode is performed, the control unit 25 executes a page inversion process that inverts the vertical relationship of all left or right page images in accordance with the page image inversion mode that has been selected.

The operation unit 22 can designate an image area of a page image number, and the control unit 25 creates a thumbnail of the designated image area. The operation unit 22 can also select an image area application mode.

This image area application mode designates the image area in the same position as the previously designated page image number to be the image area in the other page images.

Accordingly, when this application mode is performed, the control unit 25 designates the image area at the same position as the previously designated image area for all remaining page images, except for the page image having the previously designated image area, and then creates thumbnails therefor. As will be explained later, these thumbnails are output to the display of the display unit 23 along with the page images.

In addition, the operation unit 22 can select an insertion process whereby a page image is selected to insert a different page image, and a deletion process whereby a page image is selected to delete the page image. In response to this, the control unit 25 performs the insertion or deletion process on the selected page image.

The storage unit 26 is equipped with a semiconductor memory, for example, and allocates program areas where programs of the present embodiment are stored, and work data areas where the various types of data generated when the control unit 25 executes the programs are stored.

The work data area has a three-level structure management table 260 allocated therein, for example.

Figure 10:
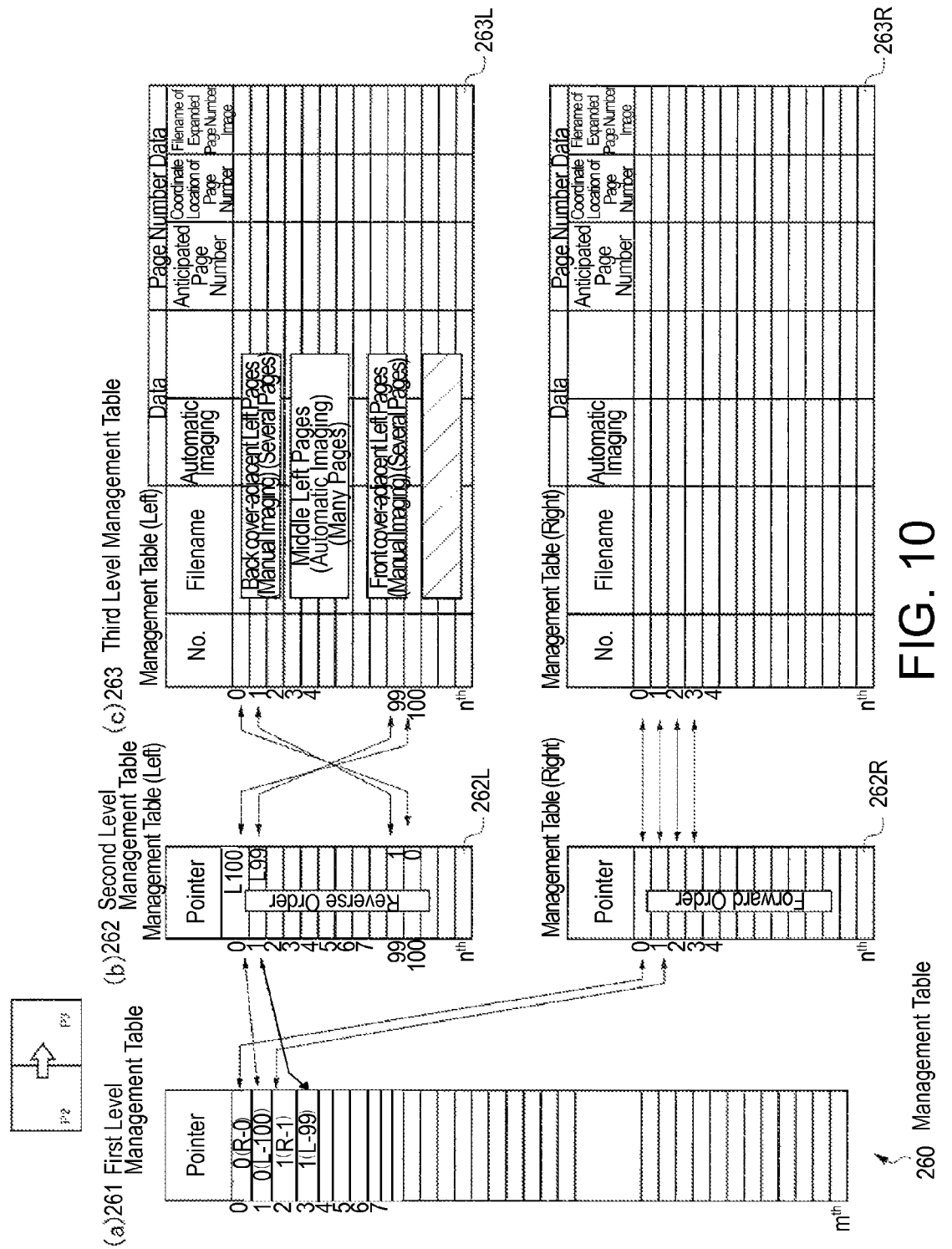
FIG. 10 is one example of the data structure of a management table.

As shown in FIG. 10, the management table 260 includes a third level management table 263 constituted by a left management table 263L for managing the left page images and a right management table 263R for managing at least the right page images, a second level management table 262 constituted by a left image order management table 262L that is linked with the left management table 263L and that manages the order of the left page images and a right image order management table 262R that is linked with the right management table 263R and that manages the order of the right page images, and a first level management table 261 that is linked with the second level management table 262 and that manages the order when the left page images and the right page images are combined together. The data structure and the like of the management table 260 will be described in detail later.

The communication unit 24 controls the communication interface with the page turning device 3, and in this case is a communication adapter that performs near field wireless communication using Bluetooth (registered trademark) or Wi-Fi (registered trademark), for example.

The page turning device 3 includes a control unit 31, storage unit 32, operation unit 33, motor driver circuit unit 34, communication unit 35, and a power source unit 36.

The storage unit 32 includes a ROM in which various types of programs are recorded, and a RAM where these programs are extracted during execution of the programs in the ROM. The control unit 31 controls the motor driver circuit unit 34 by extracting the programs in the ROM in the RAM in accordance with instruction from the operation unit 33.

The operation unit 33 includes a start switch for starting the page turning process, a stop switch for stopping the page turning process, and the like.

After the start switch is used, the control unit 31 counts the number of pages that have been turned (which may also be performed by the tablet 2) until the stop switch is used, and this count value is stored in the RAM of the storage unit 32.

In other words, the control unit 31 detects the page P turn amount performed by the turning mechanism 30 of the page turning device 3.

The motor driver circuit unit 34 includes a motor driver for reciprocating an arm unit from page-turn origin to page-turn destination, a motor driver for driving the fan, and a motor driver for driving a wind orientation adjustment unit of the vent 5.

The communication unit 35 controls a communication interface unit such as Bluetooth (registered trademark) or Wi-Fi (registered trademark), to which the tablet 2 connects.

The power source unit 36 supplies power to the respective blocks 31 to 35 described above.

Operation of Embodiment

The operation of the control system of the document camera system 1 that uses the imaging device of the present embodiment will be described below with reference to FIG. 3A onward.

Figure 3A:
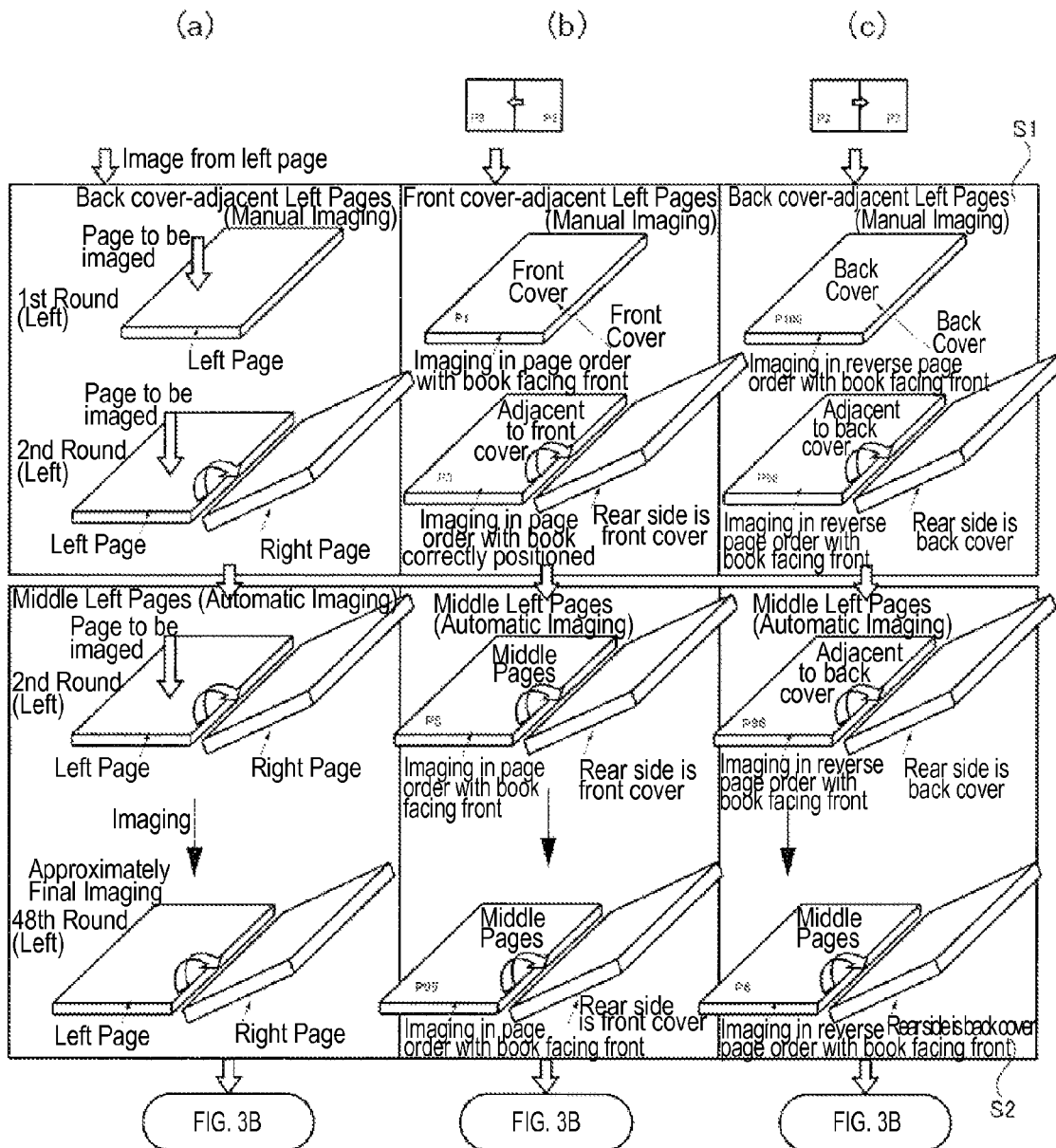
FIGS. 3A, 3B, and 3C are references for explaining the page imaging procedure.
Figure 3B:
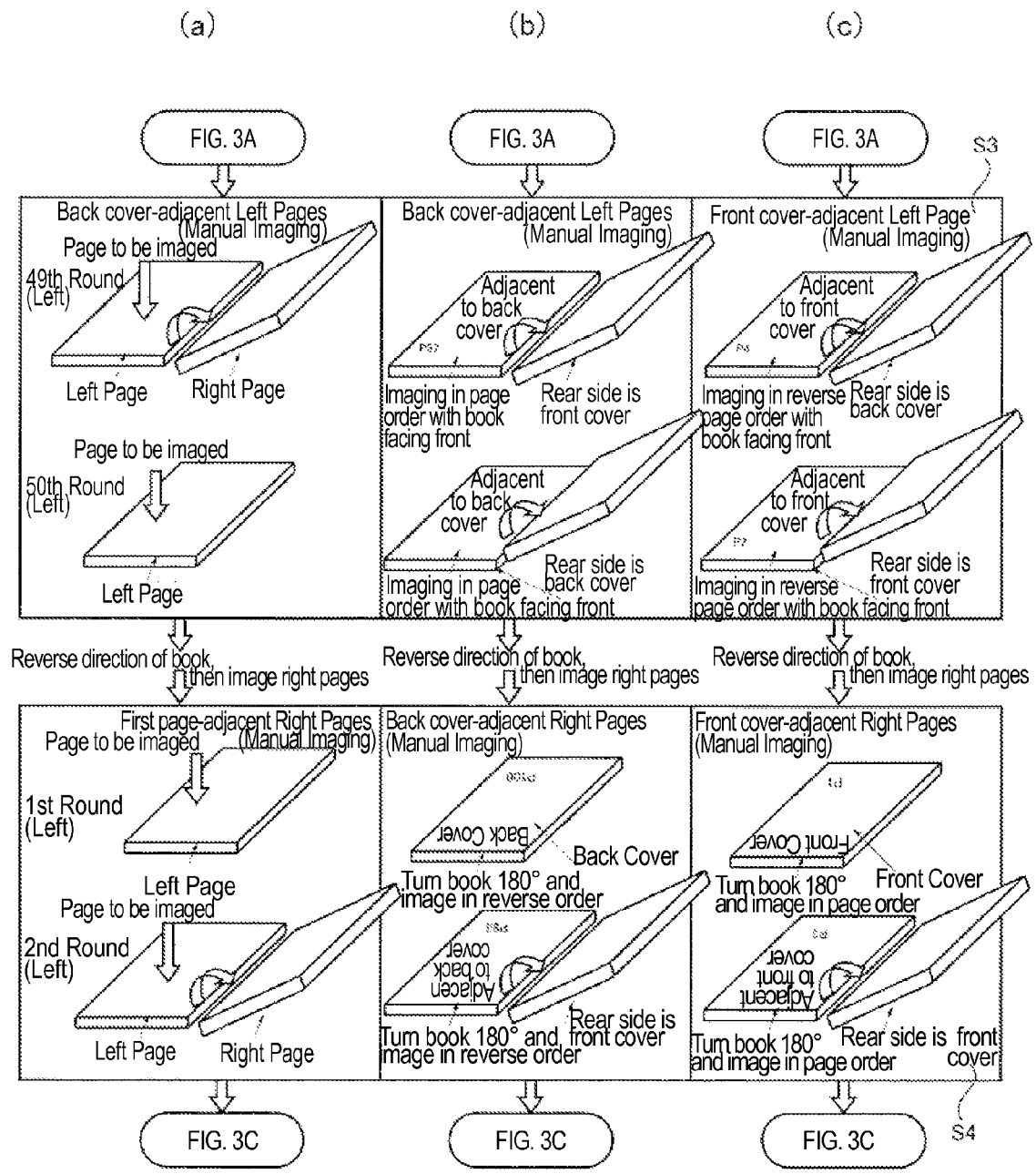
Figure 3C:
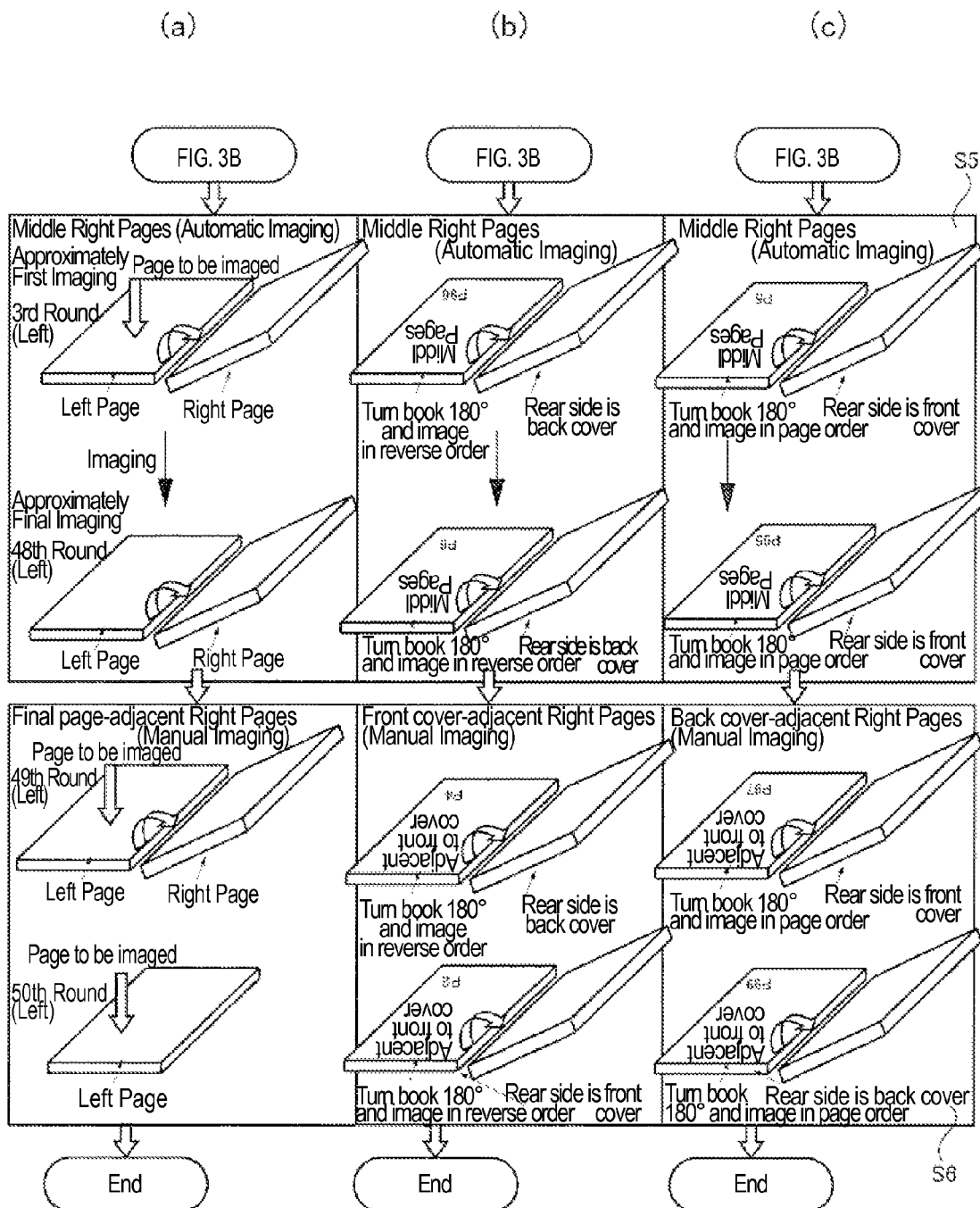

First, FIGS. 3A, 3B, and 3C will be used to explain the imaging procedure for the pages constituting the book. An imaging order is depicted for a book constituted by P1 to P100 pages, including the front and back covers.

The order of the book pages either is from left to right or from right to left, but the imaging is performed without regard for this page order.

In FIGS. 3A to 3C, the processes divided into (a), (b), and (c) are, respectively: (a) a view of the basic imaging procedure; (b) a view of the imaging procedure when the book has a page order from right to left; and (c) a view of the imaging procedure when the book has a page order from left to right.

In this example, an explanation will be given for the imaging procedure when the book is read from the left page to the right page.

In this case, first, as shown in (c) in FIG. 3A, the back cover-adjacent left pages are manually imaged (step S1).

Next, the middle left pages are imaged, but this is done automatically in conjunction with the page turning device 3 (step S2).

Then, as shown in (c) in FIG. 3B, the front cover-adjacent pages are manually imaged (step S3).

This completes the left page imaging; thus, next the book is placed in the opposite direction for right page imaging.

Specifically, as shown in (c) in FIG. 3B, the front cover-adjacent right pages are manually imaged (step S4). Next, as shown in (c) in FIG. 3C, the middle right pages in are automatically imaged in conjunction with the page turning device 3 (step S5), and the back cover-adjacent right pages are manually imaged again (step S6).

As can be understood from above, the page images from either the left pages or the right pages will be upside-down; thus, it is preferable to have a page image inversion mode that causes these page images to be inverted.

Furthermore, in this case, the page images from either the left pages or the right pages will all be imaged while upside-down; thus, it is preferable that the page image inversion mode that causes vertical inversion to be able to invert vertically of all the left pages or the right pages.

It should be noted that a scheme for imaging a single page, i.e., only one of the two pages when the book is open, has some advantages, as listed below in (1) to (4).

(1) The turning mechanism 30 is not imaged (not ghosted) at page-turn destination, (2) in order for the single page that is to be imaged to be as flat as possible, the angle at which the book opens on the holding base 6 is narrowed, and it is thus not necessary to perform strong curvature correction on the captured single page image, (3) the angle of view is narrower than if both pages were imaged, and it is therefore possible to obtain the desired quality even when a relatively low resolution camera is used, and (4) the right page images and the left page images are captured separately, and there is thus relatively little page omissions or overlap, it is easier to edit the image data, and the like.

Figures 4A, 4B:
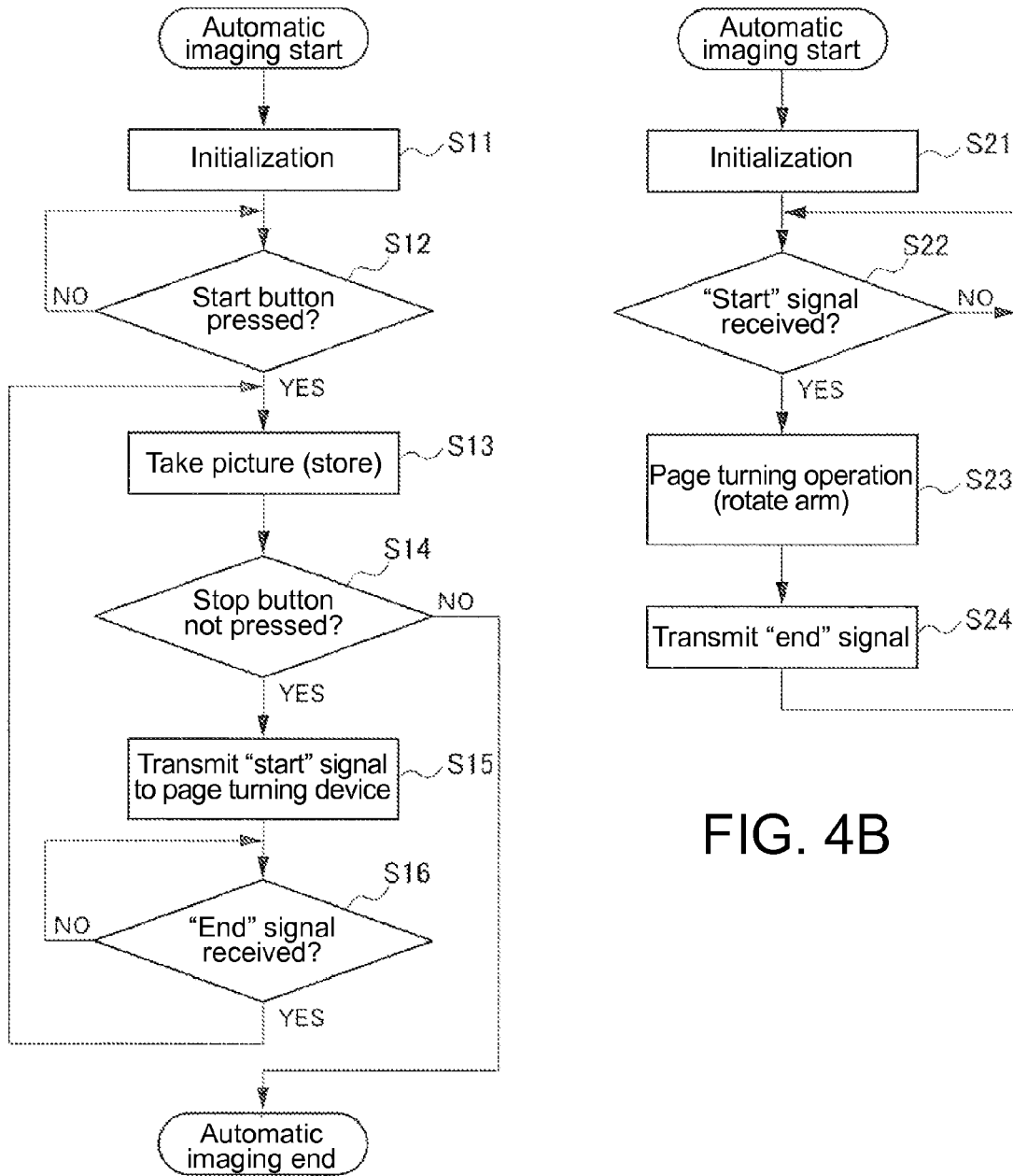
FIGS. 4A and 4B are views of the control flow during automatic imaging.

The control flow of the tablet 2 and the page turning device 3 during automatic imaging in conjunction with the page turning device 3 is shown in FIGS. 4A and 4B.

As shown in FIG. 4A, after initialization of the control unit 25 (step S11), the tablet 2 begins imaging when the user operates the operation unit 22 (presses the start button) (YES in step S12), and the control unit 25 uses an embedded camera to obtain images and then stores these captured images in the working area of the storage unit 26 (step S13).

Next, if the user has not pressed the end button of the operation unit 22 (YES in step S14), then a "start" command, which is a page turning order, is transmitted to the page turning device 3 via the communication unit 24 (step S15).

The communication unit 24 then waits until a status signal "end" that indicates the end of the page turning operation is received from the page turning device 3 (step S16), and when "end" is received (YES in step S16), the embedded camera acquires an image and stores the captured image in the working area of the storage unit 26 (step S13).

Meanwhile, as shown in FIG. 4B, if the page turning device 3, after initialization of the control unit 31 (step S21), receives a "start" command from the tablet 2 via the communication unit 35 (YES in step S22), then the motor driver circuit unit 34 drives the motor to rotate the arm so as to turn a single page P of the book B (step S23).

When the page turning operation has finished, the page turning device transmits an "end" signal (step S24), and waits for the next "start" command from the tablet 2.

Repeatedly performing this operation allows for page turning and automatic imaging to be automated in conjunction with one another and for each page of the book to be saved in the storage unit 26 of the tablet 2 as image data.

Next, control of the tablet 2 during manual imaging, which is not performed in conjunction with the page turning device 3, will be explained with reference to the control flow in FIG. 5.

Figures 5, 6A, 6B:
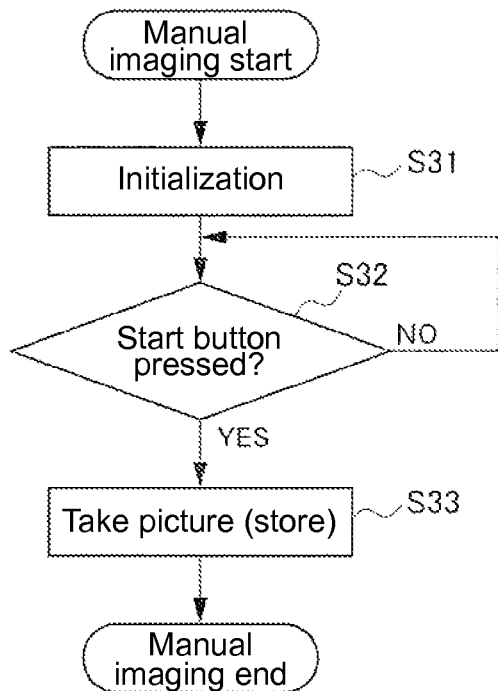
FIG. 5 is a view of the control flow during manual imaging.
FIGS. 6A and 6B are examples of serial numbers given during imaging.

As seen in FIG. 5, when manual imaging is started, the control unit 25 of the tablet 2 initializes (step S31) and waits for the user to press the start button (step S32). When the start button is pressed (YES in step S32), the embedded camera acquires an image and stores this captured image (page image) in the working area of the storage unit 26 and then ends manual imaging (step S33).

It should be noted that, as shown in FIGS. 6A and 6B, the captured image is given a serial number starting from zero and indicating left page or right page and the imaging mode, in the format "left-front (middle/back/retake)-00-".

"Front" refers to adjacent to the front cover during manual imaging mode, "middle" refers to the middle pages during automatic imaging mode, "back" refers to adjacent to the back cover during manual imaging mode, and "retake" refers to a retake during manual imaging mode.

In addition, the serial number is managed by the left page counter and the right page counter, which are allocated by a program by the control unit 25, as described later.

Next, a specific method of imaging will be explained. First, the user prepares the tablet 2 and the page turning device 3 shown in FIG. 1, fixes a book to the top of the holding base 6, and places the tablet 2 on the stand 20 such that the camera (imaging unit) mounted on the back thereof faces the book.

The tablet 2 then waits for user operation via the imaging menu of the tablet and performs automatic imaging mode in conjunction with the page turning device 3, or manual imaging mode, which is not performed in conjunction with the page turning device.

Figure 7:
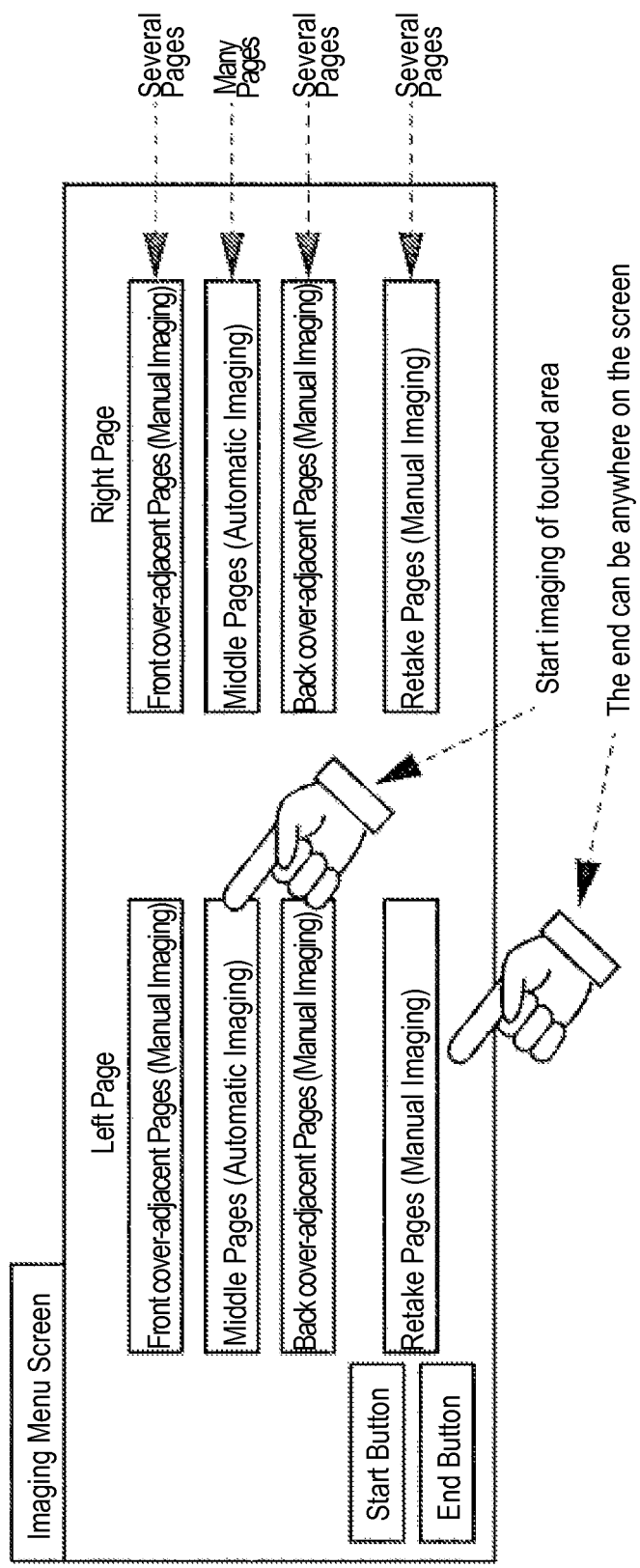
FIG. 7 is a view of one example of an imaging menu.

FIG. 7 shows one example of the imaging menu screen shown on the display unit 23 of the tablet 2. As shown in FIG. 7, the screen has a "start button," an "end button," and, for both the left and right pages, one each of the following imaging modes on the menu: "front cover-adjacent pages (manual imaging)," "middle pages (automatic imaging)," "back cover-adjacent pages (manual imaging)," "retake pages (manual imaging)." After setting the imaging mode by using the menu, the user can press the "start button" or the "end button" to instruct the start or end of imaging.

Figure 8:
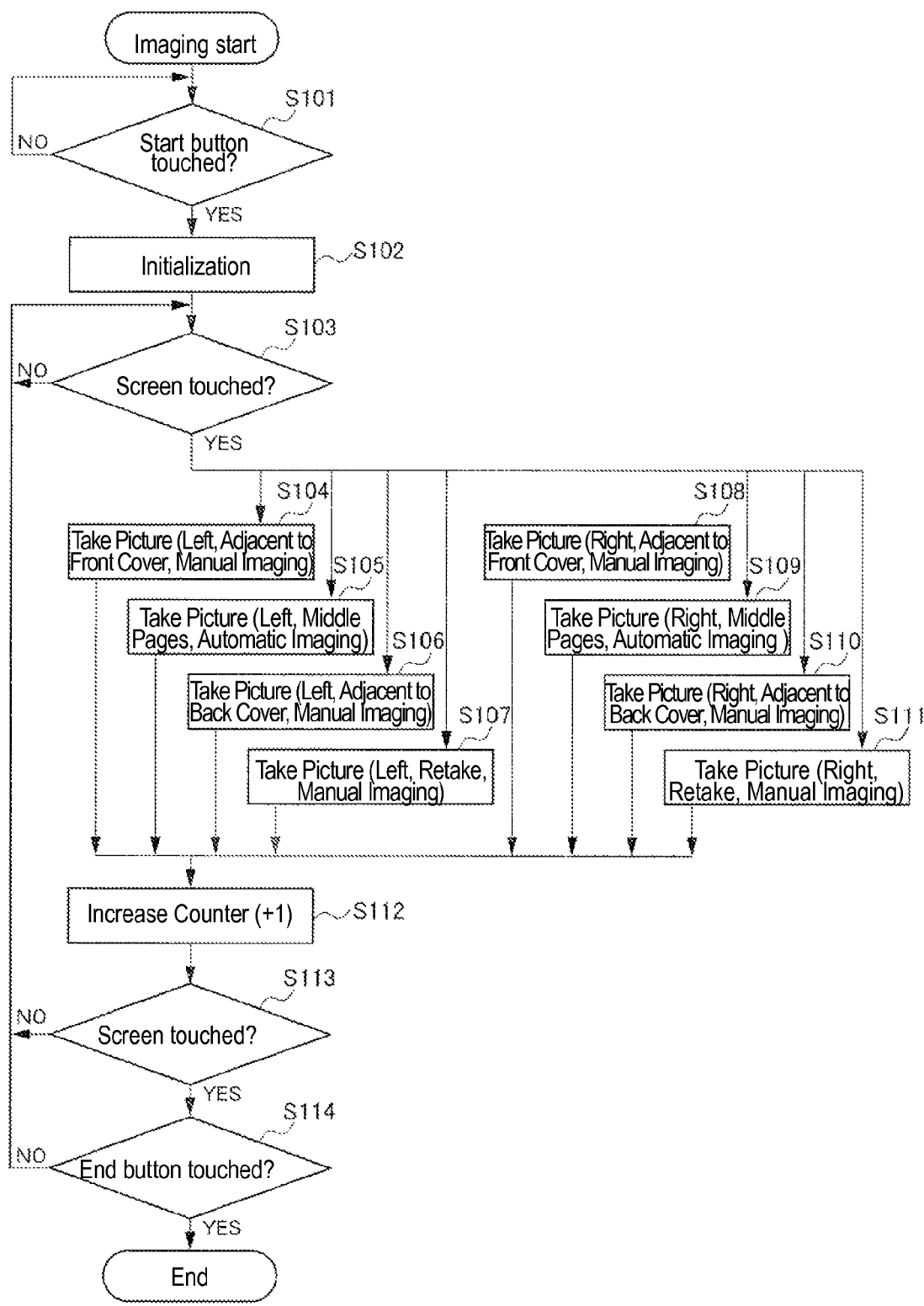
FIG. 8 is a view of the basic control flow during imaging.
Figure 9A:
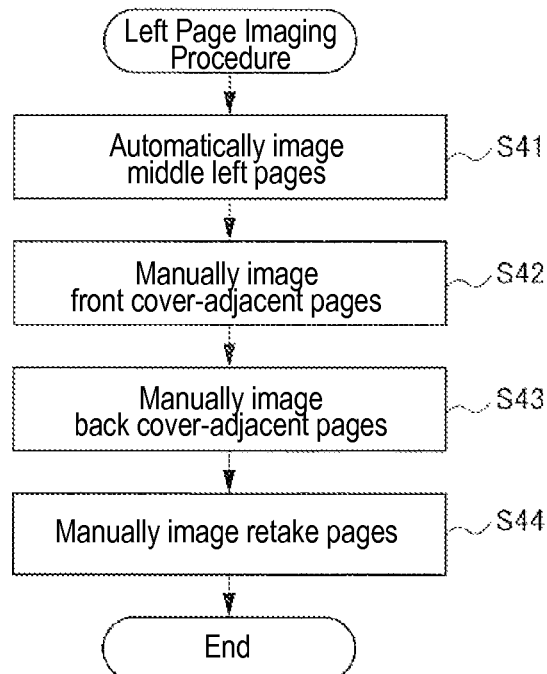
FIGS. 9A and 9B are flow charts showing the imaging procedure for the left and right pages.
Figure 9B:
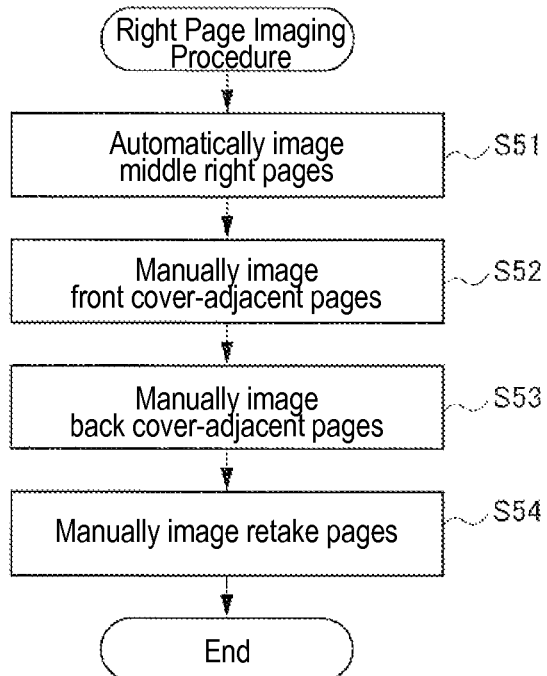

FIG. 8 shows the control flow of the control unit 25 of the tablet 2 based on imaging menu operation by the user, and FIGS. 9A and 9B show the flow of the imaging procedure by the user.

In FIG. 8, when the user presses (touches) the "start button" allocated on the display unit 23 screen of the tablet 2 (YES in step S101), the control unit 25 of the tablet 2 initializes the corresponding counters, registers, or the like through a program (step S102), and watches for further touch operations on the screen of the display unit 23 by the user (step S103).

In this example, when the user touches one left page imaging mode from among the front cover-adjacent pages imaging mode (manual imaging), middle pages imaging mode (automatic imaging), back cover-adjacent pages imaging mode (manual imaging), or retake imaging mode (manual imaging) (steps S104 to S107), the control unit 25 controls the imaging unit 21 to start imaging the left pages and to update the left page counter with +1 (step S112).

Meanwhile, when the user touches one right page imaging mode from among the front cover-adjacent pages imaging mode (manual imaging), middle pages imaging mode (automatic imaging), back cover-adjacent pages imaging mode (manual imaging), or retake imaging mode (manual imaging) (steps S108 to S111), the control unit 25 controls the imaging unit 21 to start imaging the right pages and to update the right page counter with +1 (step S112).

The control unit 25 creates a page number based on the imaging mode, and then continues to watch for touch operation on the screen of the display unit 23 by the user (step S113). In this example, the control unit 25 waits for the "end button" to be pressed, and when pressed (YES in step S114), ends the series of imaging processes.

If the control unit 25 does not detect that the "end button" has been pressed (NO in step S114), then the control unit 25 returns to the touch operation watch process relative to the screen in step S103 and repeatedly performs the subsequent processes therefrom.

FIG. 9A shows the imaging procedure for the left pages, and FIG. 9B shows the imaging procedure for the right pages. In this example, it is possible to perform eight different types of imaging. First, the user images the left pages, and when the imaging of the left pages has finished, the user turns reverses the book and images the right pages. Pages that need to be retaken are manually imaged later. The captured images (page images) are stored in a prescribed area of the storage unit 26 under control of the control unit 25.

In other words, for both the left and right pages, the user can touch the imaging location (front/back cover-adjacent pages, middle pages, retake pages) displayed on the display unit 23 of the tablet 2 to start the corresponding imaging mode at that location.

In this example, for both the left and right pages, imaging is performed in the following order: middle pages, front cover-adjacent pages, back cover-adjacent pages, and retake pages (steps S41 to S44 in FIG. 9A and steps S51 to S54 in FIG. 9B).

Imaging can be ended (stopped) by touching any location on the display unit 23 of the tablet 2.

(Data Structure for Data Management of Page Images)

Next, the management functions (order confirmation and editing operation) for the large number of page images stored in the storage unit 26 will be explained. The imaging device (tablet 2) according to the present embodiment manages the page images through the three-level structure management table 260 (storage unit 26), which is one example of a data structure, as shown in FIG. 10.

As shown in FIG. 10, the three-level structure management table 260 includes the first level management table 261, the second level management table 262, and the third level management table 263. The third level management table 263, the second level management table 262, and the first level management table 261 will be explained in detail in the stated order below.

(Third Level Management Table)

The third level management table 263 is constituted by the left management table 263L (management table (left)), which manages the left page images from the book, and the right management table 263R (management table (right)), which manages the right page images from the book.

As shown in FIG. 10, the left management table 263L and the right management table 263R set a number (NO.), filename, captured page image data, and page number data as data items for each entry.

Furthermore, the 0 to n on the left side of the left management table 263L and the right management table 263R correspond to write pointer numbers.

It should be noted that the page number data for the data items include anticipated page number, coordinate location of page number, and filename of enlarged image (thumbnail image) of the page number.

As described in detail later, if the anticipated page number is given to one of the left pages or the right page images, the remaining left or right page images can be automatically given page numbers with this anticipated page number as the reference.

Next, in order to understand the status of the page image to be stored in the third level management table 263, the creation procedure for the third level management table 263 will be explained in detail with reference to FIG. 11.

In the explanation below, unless otherwise specified, an example will be given in which the page images are captured in an imaging procedure whereby the book shown in FIGS. 3A, 3B, and 3C is read in order from the left page to the right page.

In other words, an example will be explained in which imaging is performed in the following order: back cover-adjacent left pages (manual imaging)→middle left pages (automatic imaging)→front cover-adjacent left pages (manual imaging)→front cover-adjacent right pages (manual imaging)→middle right pages (automatic imaging) →back cover-adjacent right pages (manual imaging).

Figure 11:
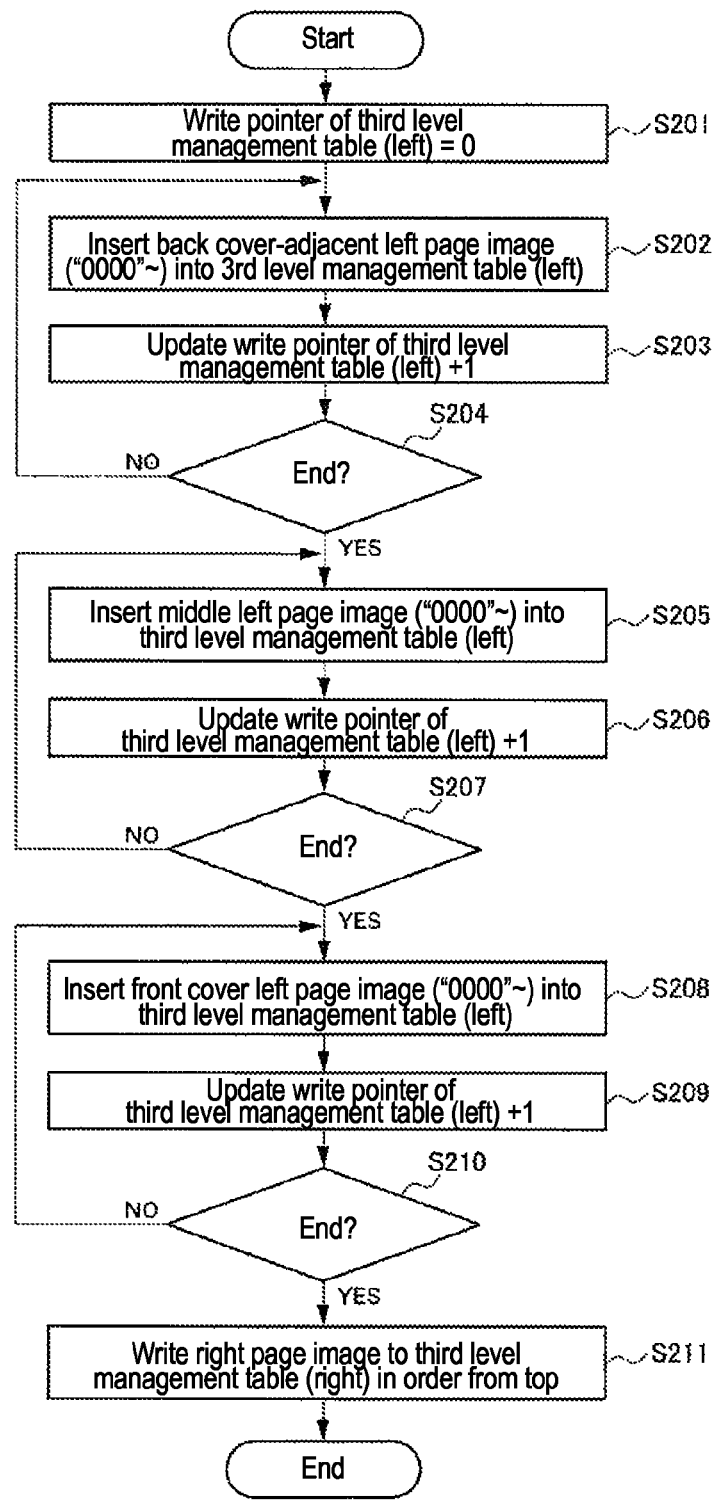
FIG. 11 is a view of the generation flow of the third level of the management table.

As shown in FIG. 11, all page images captured by the imaging unit 21 under control of the control unit 25 are written in order to the left management table 263L or the right management table 263R of the third level management table 263.

Specifically, the control unit 25 first sets the write pointer of the left management table 263L in the third level management table 263 to 0 (step S201).

Next, the back cover-adjacent left page image ("0000"-) that is imaged first is stored in a storage area where the write pointer of the left management table 263L is 0 (step S202), and the write pointer of the left management table 263L is then updated +1 (step S203).

The control unit 25 then stores the back cover-adjacent left page image ("0000"-) that is imaged next in a storage area where the write pointer of the left management table 263L is 1 (step S202), and the write pointer of the left management table 263L is then updated +1 (step S203).

This operation is repeated until all back cover-adjacent left page images ("0000"-) have been stored, and when all the page images have been stored (YES in step S204), the control unit 25 proceeds to step S205.

It should be noted that the write pointer of the left management table 263L at YES in step S204 is x.

When storage of all of the back-cover adjacent left page images ("0000"-) has finished (YES in step S204), the control unit 25 stores the middle left page image ("0000"-) that is imaged first in a storage area where the write pointer of the left management table 263L is x (step S205), and then updates the write pointer of the left management table 263L with +1 (step S206).

Next, the control unit 25 stores the middle left page image that is imaged next in a storage area where the write pointer of the left management table 263L is x+1 (step S205), and updates the write pointer of the left management table 263L with +1 (step S206).

This operation is repeated until all of the middle left page images ("0000"-) have been stored, and when all of these page images have been stored (YES in step S207), the control unit 25 proceeds to step S208.

It should be noted that the write pointer of the left management table 263L at YES in step S207 is y.

When storage of all of the middle left page images ("0000"-) has finished (YES in step S207), the control unit 25 stores the front cover-adjacent left page ("0000"-) that is imaged first in a storage area where the write pointer of the left management table 263L is y (step S208), and then updates the write pointer of the left management table 263L with +1 (step S209).

Next, the control unit 25 stores the front cover-adjacent left page that is imaged next in a storage area where the write pointer of the left management table 263L is y+1 (step S208), and updates the write pointer of the left management table 263L with +1 (step S209).

This operation is repeated until all of the front cover-adjacent left pages ("0000"-) have been stored, and when all of these page images have been stored (YES in step S210), the control unit 25 proceeds to step S211.

It should be noted that left page retake images are shown in FIG. 10, but in this example, the retake images are not written.

As can be understood from the above, in the left management table 263L, the write pointers have an ascending order, whereas the page numbers of the stored page images have a descending order.

When the storage of the left page images is finished, the control unit 25 then writes the right page images to the right management table 263R (step S211).

The write process of step S211 is fundamentally the same as the process of writing the left page images, and the control unit 25 causes the write pointers of the right management table 263R to ascend from 0 while storing the right page images in the storage areas corresponding to the respective write pointers.

Specifically, the right pages are stored in the following order: front cover-adjacent right pages (manual imaging) →middle right pages (automatic imaging)→back cover-adjacent right pages (manual imaging). When all right page images are stored in the storage regions corresponding to the respective write pointers of the right management table 263R, the creation of the third level management table 263 ends.

In this example, the difference between the right management table 263R and the left management table 263L is that, in the right management table 263R, both the write pointers and the page numbers of the stored page images have an ascending order.

It should be noted that, for a book that opens in the opposite direction, or namely, in (b) in FIGS. 3A to 3C, the imaging order is reversed; thus, the page images stored in the left management table 263L are ascending, and the page images stored in the right management table 263R are descending.

(Second Level Management Table)

Next, the second level management table 262 shown in FIG. 10 will be explained.

The second level management table 262 is constituted by the left image order management table 262L (management table (left)) that is linked with the left management table 263L of the third level management table 263 and that manages the order of the left pages, and the right image order management table 262R (management table (right)) that is linked with the right management table 263R and that manages the order of the right pages.

In this example too, the creation procedure of the second level management table 262 will be described in detail with reference to FIG. 12 in order to explain the link between the second level management table 262 and the third level management table 263.

Figure 12:
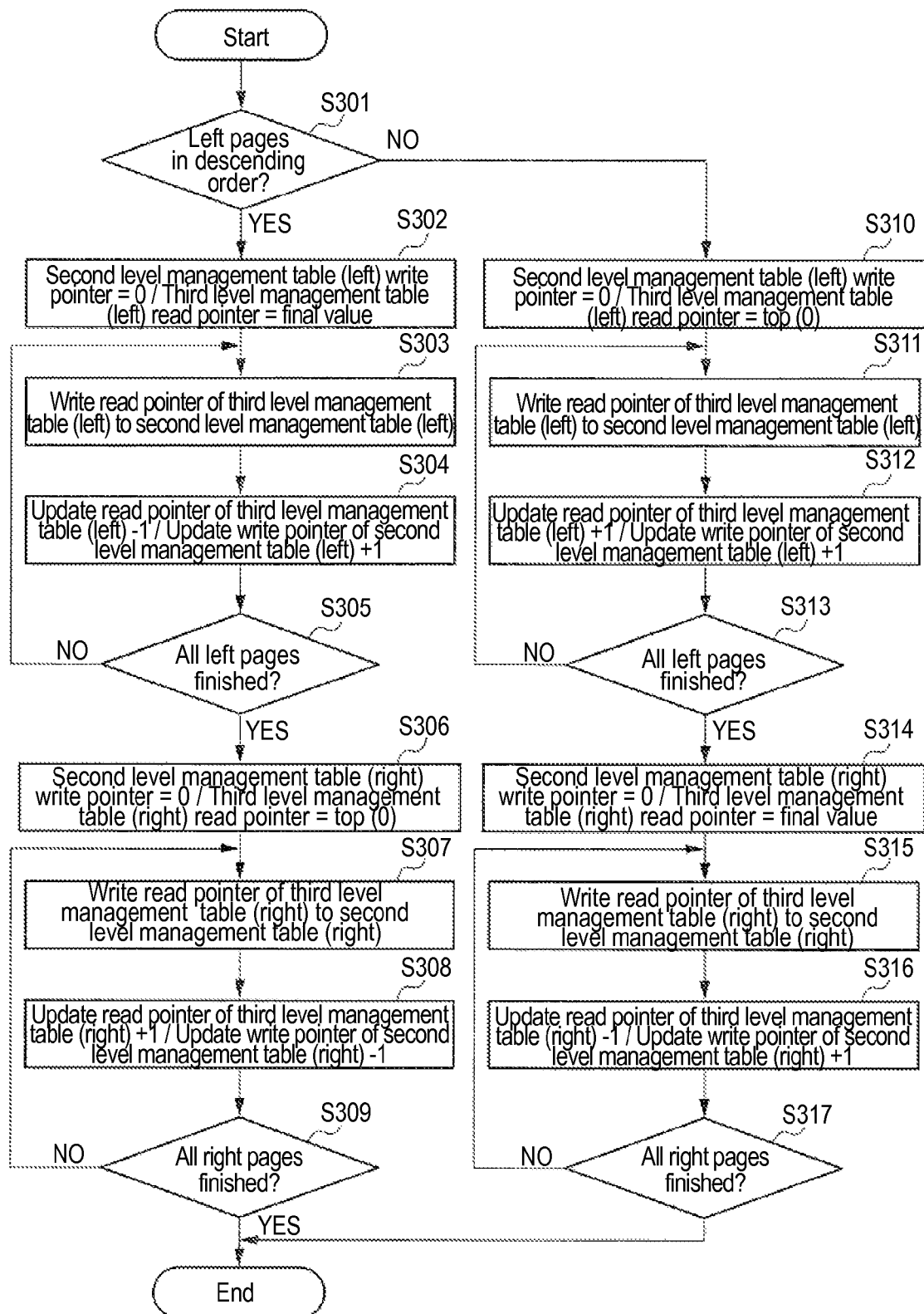
FIG. 12 is a view of the generation flow of the second level of the management table.

As shown in FIG. 12, the control unit 25 first determines whether the page images of the left management table 263L have a descending order (step S301).

Specifically, this is determined by whether the book is read from right to left (ascending) as shown in (b) in FIGS. 3A to 3C, or whether the book is read from left to right (descending) as shown in (c) in FIGS. 3A to 3C.

The example of the left management table 263L described above has a descending order; therefore, this is YES in step S301, and the control unit 25 sets the write pointer of the left image order management table 262L of the second level management table 262 to 0, and updates the read pointer of the left management table 263L of the third level management table 263 to the final value (step S302).

Next, the read pointer of the left management table 263L is stored in a read pointer that corresponds to the write pointer 0 of the left image order management table 262L of the second level management table 262 (step S303), the read pointer of the third level management table 263 is updated with −1, and the write pointer of the second level management table 262 is updated with +1 (step S304).

The processes in steps S303 and S304 described above are repeated until this process has been performed for all page images of the left management table 263L.

In FIG. 10, the left management table 263L also has the left retake page images therein, but these retake page images have not yet been stored in the left management table 263L, and thus "all page images" in steps S303 and S304 means from the back cover-adjacent left pages to the front cover-adjacent left pages.

It should be noted that, if the retake page images are already stored when steps S303 and S304 are performed, then steps S303 and S304 should be performed on all page images except the retake page images.

This process leads to the link that is shown by both arrows between the left image order management table 262L (management table (left)) and the left management table 263L of the third level management table 263 in FIG. 10.

As can be understood from FIG. 10, the left image order management table 262L is linked such that the left page images stored in descending order in the left management table 263L line up in ascending order.

Next, when processing has ended for all of the page images of the left management table 263L (YES in step S305), the control unit 25 sets the write pointers of the right image order management table 262R of the second level management table 262 to 0 and updates the read pointers of the right management table 263R of the third level management table 263 to the top position (0) (step S306).

Next, the read pointer of the right management table 263R of the third level management table 263 is stored in a read pointer that corresponds to the write pointer 0 of the right image order management table 262R of the second level management table 262 (step S307), the read pointer of the right management table 263R of the third level management table 263 is updated with +1, and the write pointer of the right image order management table 262R of the second level management table 262 is updated with +1 (step S308).

The processes of steps S307 and S308 described above are repeated until all page images of the right management table 263R of the third level management table 263 have been processed.

When this process is performed on all of the page images of the right management table 263R of the third level management table 263 (YES in step S309), the creation process of the second level management table 262 ends.

This process leads to the link that is shown by both arrows between the right image order management table 262R (management table (right)) and the right management table 263R of the third level management table 263 in FIG. 10.

As can be understood from FIG. 10, the right image order management table 262R is linked such that the right page images stored in ascending order in the right management table 263R line up in ascending order.

Meanwhile, if the book is read from right to left (ascending order), this is NO in step S301, and in this case, the left page images have been previously imaged opposite in ascending order, and the right page images have been imaged in descending order; thus, the imaging will be the reverse of these previous processes (see (b) in FIGS. 3A to 3C).

Therefore, if NO in step S301, the control unit 25 sets the write pointers of the left image order management table 262L of the second level management table 262 to 0 and updates the read pointers of the left management table 263L of the third level management table 263 to the top position (0) (step S310).

Next, the control unit 25 stores the read pointer of the left management table 263L of the third level management table 263 in a read pointer corresponding to the write pointer 0 of the left image order management table 262L of the second level management table 262 (step S311). Next, the read pointer of the left management table 263L of the third level management table 263 is updated to +1, and the write pointer of the left image order management table 262L of the second level management table 262 is updated with +1 (step S312).

The processes of steps S311 and S312 described above are repeated until all page images of the left management table 263L of the third level management table 263 have been processed.

This process is the reverse of the previous process, and makes the link of the left image order management table 262L such that the left page images stored in ascending order in the left management table 263L remain lined up in the ascending order.

Next, when processing of all page images of the left management table 263L of the third level management table 263 has finished (YES in step S313), the control unit 25 sets the write pointers of the right image order management table 262R of the second level management table 262 to 0, and updates the read pointers of the right management table 263R of the third level management table 263 to the final value (step S314).

Next, the read pointer of the right management table 263R of the third level management table 263 is stored in a read pointer that corresponds to the write pointer 0 of the right image order management table 262R of the second level management table 262 (step S315), the read pointer of the right management table 263R of the third level management table 263 is updated with −1, and the write pointer of the right image order management table 262R of the second level management table 262 is updated with +1 (step S316).

The processes of steps S315 and S316 described above are repeated for all page images of the right management table 263R of the third level management table 263, and when the processing of all these page images has finished (YES in step S317), the creation process of the second level management table 262 ends.

This process is the reverse of the previous processes, and makes the link for the right image order management table 262R such that the right page images stored in descending order in the right management table 263R line up in ascending order.

(First Level Management Table)

Next, the first level management table 261 shown in FIG. 10 will be explained.

The first level management table 261 is linked with the second management level table 262 and manages the order when the left page images and the right page images are combined together.

In this example too, the creation procedure of the first level management table 261 will be described in detail with reference to FIG. 13 in order to explain the link between the second level management table 262 and the first level management table 261.

Figure 13:
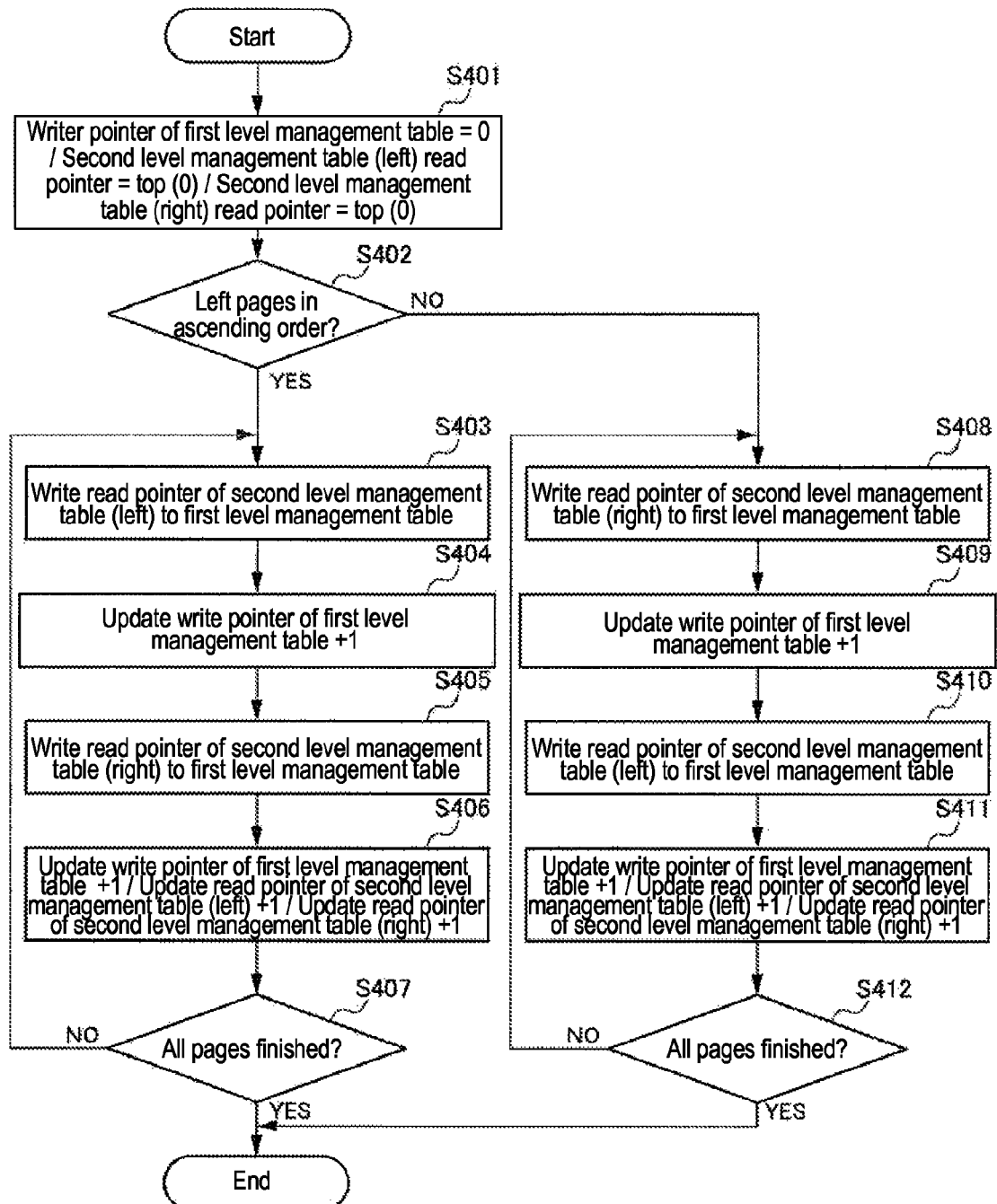
FIG. 13 is a view of the generation flow of the first level of the management table.

As shown in FIG. 13, the control unit 25 first updates the write pointer of the first management level table 261 to 0, updates the read pointer of the left image order management table 262L of the second management level table 262 to 0 at the top, and updates the read pointer of the right image order management table 262R to 0 at the top (step S401).

Next, the control unit 25 determines whether the left pages of the left management table 263L are in ascending order (step S402).

Specifically, this is determined by whether the book is read from right to left (ascending) as shown in (b) in FIGS. 3A to 3C, or whether the book is read from left to right (descending) as shown in (c) in FIGS. 3A to 3C.

Next, the example of the left management table 263L described above is in descending order, and is thus NO in step S402. The control unit 25 stores the read pointer of the right image order management table 262R of the second level management table 262 in the read pointer corresponding to the write pointer 0 of the first level management table 261 (step S408), and updates the write pointer of the first level management table 261 with +1 (step S409).

Next, the control unit 25 stores the read pointer of the left image order management table 262L of the second management table 262 in the read pointer corresponding to the write pointer 1 of the first level management table 261 (step S410), updates the write pointer of the first level management table 261 with +1, and updates both read pointers of the left image order management table 262L and the right image order management table 262R of the second level management table 262 with +1 (step S411).

The processes in steps S408 to S411 described above are repeated until processing is finished for all of the page images of the second level management table 262 (left image order management table 262L and right image order management table 262R), and when processing is finished for all these page images (YES in step S412), the creation process of the first management level table 261 is ended.

This process leads to the link shown by both arrows between the first level management table 261 and the second level management table 262 in FIG. 10.

As can be understood from FIG. 10, the first level management table is linked such that the page images of the second level management table (left image order management table 262L and right image order management table 262R) line up in an order that forms a book, and the first level management table manages the order when the left page images and the right page images are combined together.

Meanwhile, if the book is read from right to left (ascending order), then this is YES in step S402, and in this case, the left page images have been previously imaged in the reverse in the ascending order, and the right page images have been imaged in descending order; thus, the processes become the reverse of the previous processes (see (b) in FIGS. 3A to 3C).

Therefore, if YES in step S402, then the control unit 25 stores the read pointer of the left image order management table 262L of the second level management table 262 in a read pointer that corresponds to the write pointer 0 of the first level management table 261 (step S403), and updates the write pointer of the first level management table 261 with +1 (step S404).

Next, the control unit 25 stores the read pointer of the right image order management table 262R of the second management table 262 in the read pointer corresponding to the write pointer 1 of the first level management table 261 (step S405), updates the write pointer of the first level management table 261 with +1, and updates both read pointers of the left image order management table 262L and the right image order management table 262R of the second level management table 262 with +1 (step S406).

The processes in steps S403 to S406 described above are repeated until processing is finished for all of the page images of the second level management table 262 (left image order management table 262L and right image order management table 262R), and when processing is finished for all of these page images (YES in step S407), the creation process of the first management level table 261 is ended.

This process results in a table that manages the order when the left page images and right page images of a book that is opposite to previously, i.e., a book that is read from right to left (ascending order), are combined together.

(Page Image Editing Function)

The editing operation using the management table 260 will be explained below with reference to FIGS. 14A to 20.

The editing operation uses the three-level structure management table 260 created as described above.

The control unit 25 can use the management table 260 to manage the page images captured by imaging.

In other words, the page order of one book is equal to the order of the first level management table 261, the left pages are equal to the order of the left image order management table 262L of the second level management table 262, and the right pages are equal to the order of the right image order management table 262R.

Figure 14A:
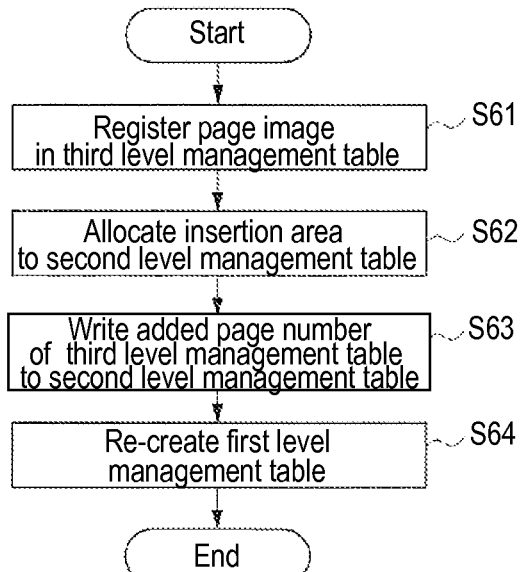
FIGS. 14A, 14B, and 14C are views of management flows of the page images.

As shown in FIG. 14A, when adding new pages to this order, the control unit 25 respectively registers the page images with the third level management table 263, for example (step S61).

This registration process writes the left page retake images to the left management table 263L of the third level management table 263 shown in FIG. 10, for example. The number data of the page images are respectively inserted in the second level management table 262.

Namely, in order to allocate (make space for) a storage area of the second level management table 262 where insertion is desired, lower numbers are moved to lower levels from the position where insertion in the second level management table 262 is desired (step S62). The added numbers of the third level management table 263 are then added into this open space (step S63).

It should be noted that, in this case, the first level management table 261 needs to be created again in accordance with the control flow shown in FIG. 13 (step S64).

Figure 14B:
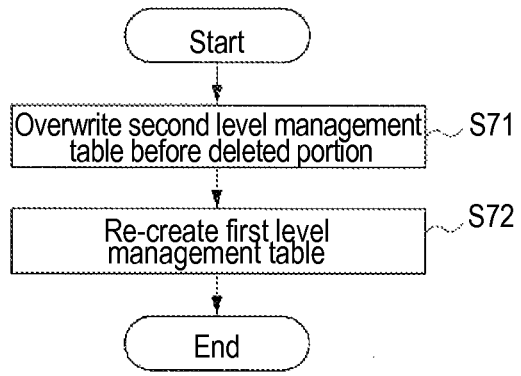

Furthermore, as shown in FIG. 14B, when deleting a specific page, with respect to the page order described above, the control unit 25 moves lower parts from the area where deletion is desired in the second level management table 262 (left image order management table 262L, right image order management table 262R) to one place higher, and overwrites the part where deletion is desired, for example (step S71).

In this case too, the first level management table 261 needs to be created again with the procedure shown in FIG. 13 (step S72).

Figure 14C:
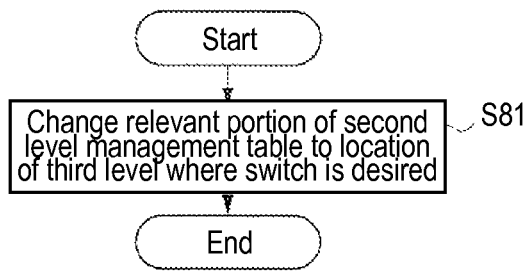

Furthermore, as shown in FIG. 14C, when switching a specific page, with respect to the page order described above, the control unit 25 changes the corresponding part of the second level management table 262 (left image order management table 262L, right image order management table 262R) to a position in the third level management table 263 (left management table 263L, right management table 263R) that corresponds to the page image where exchange is desired, for example (step S81). In this case, it is not necessary to change the first level management table 261.

It is possible to digitize a book by using the management table 260 as created above to link all of the captured images in order. In other words, if the page images are displayed in the order listed in the three-level structure management table 260, the page images can be read in the same page order as the book. In order verify the accuracy of the page order, however, it is necessary to confirm the page number portion of the images. Thus, in the imaging device (tablet 2) of the present embodiment, a function has been added to expand and display the page number portion, as described below.

(Coordinate Location and Expanded Image of Page Number)

Figure 15A:
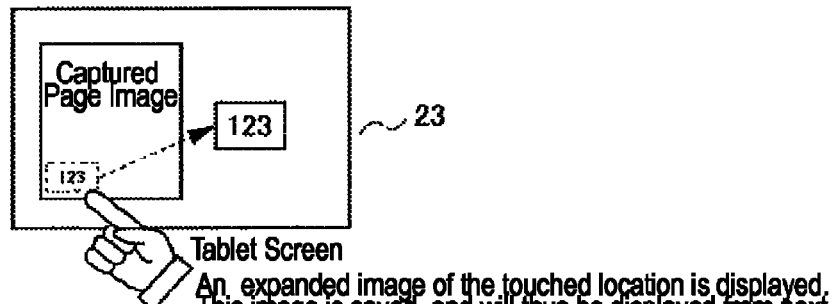
FIGS. 15A and 15B are views of expanded display of the page number and the control flow therefor.
Figure 15B:
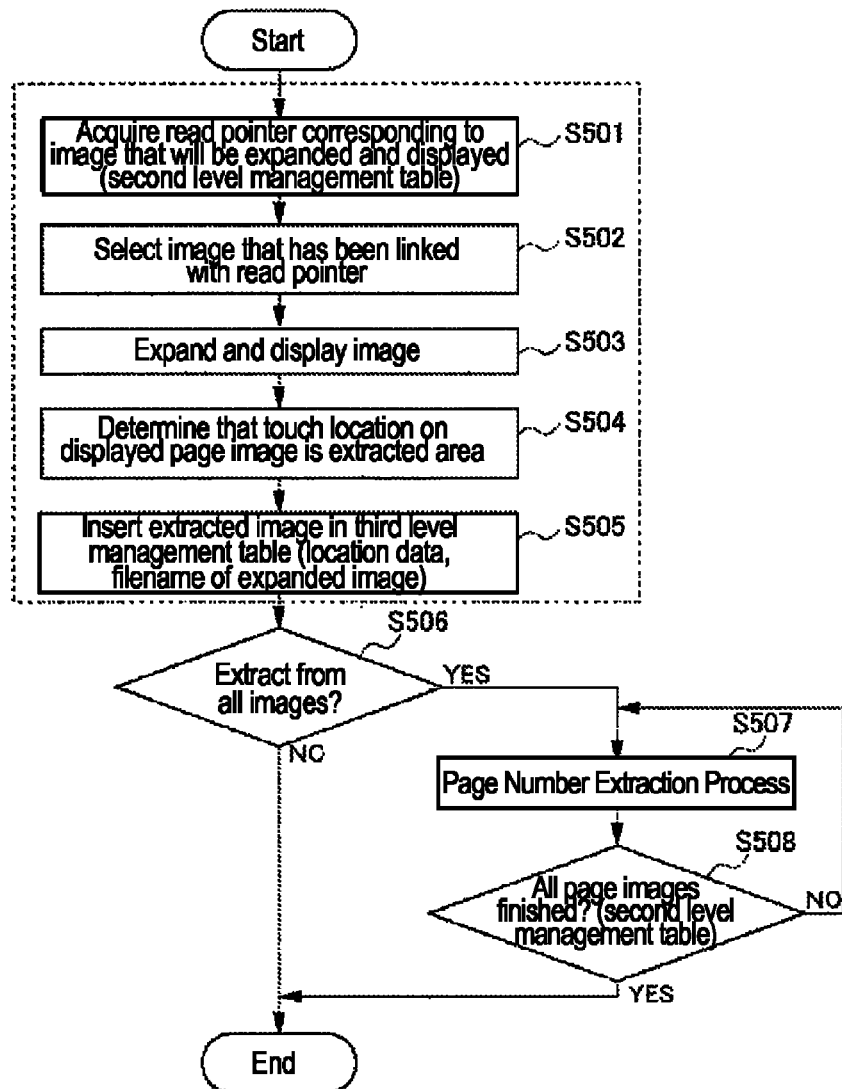

FIGS. 15A and 15B are views of expanded display of the page number and the control flow therefor. In the expanded display example shown in FIG. 15A, when the user extracts a page image that has been imaged and stored, and then designates the area where expansion is desired, the page number portion "123" is expanded and displayed.

Saving this expanded image of the page number will display this image from the next time onwards without the designation of the user.

Therefore, as shown in FIG. 10, the right or left management table (263L or 263R) of the third level management table 263 stores the expanded image filename of the page image number and the coordinate position of the page number (the area with the extracted page number) as page number data.

The position of the page number on the left page of the book is approximately the same for every page.

The position of the page number on the right page of the book is also approximately the same location for every page.

Accordingly, as shown in FIG. 15A, on any page image of the left pages, if the area with the page number is designated and then this area (coordinate location of the page number) is specified, it is possible to obtain expanded images (thumbnails) of the page numbers for all left page images with ease if the areas on these page images at the same location as the abovementioned specified area are automatically extracted for all remaining left pages (application mode in one aspect of the present invention).

In a similar manner with respect to the right pages, as long as the area (coordinate location of the page number) of the page number is specified for any right page image, it is possible to designate the coordinate location of the page number for all right page images with ease, and to obtain expanded images (thumbnails) of the page numbers by extracting the images at this same coordinate location (application mode in one aspect of the present invention).

Therefore, it is preferable that, after the area with the page number or the like has been designated, it be possible to choose if this designated location (area) is only applied to the one page image or if the designated location is applied to all of the left or right page images.

If applied to all pages, the designated location (area), or namely, the coordinate location with the page number is stored in the page number data for each page image including the other page images of the third level management table 263, along with the expanded image (thumbnail) filenames of the page numbers having the extracted location.

The acquisition procedure for the coordinate location of the page number and the expanded image (thumbnail) of the page number will be explained in detail below with reference to FIG. 15B.

It should be noted that the process of acquiring the extracted image (thumbnail) of the page number portion from the left page image and the process of acquiring the extracted image (thumbnail) of the page number portion from the right page image differ only in the area of the image that is designated; thus, a procedure for acquiring the extracted image (thumbnail) of the page number portion from the left page image will be explained below.

In the process to obtain this thumbnail, however, it is also possible for the user to designate the extracted area of the respective page images, and in this case, it is not necessary to separately process the left page images and the right page images.

First, the user causes the left page images to be displayed on the display unit 23 (start), and touches the left page image that the user wishes to enlarge in order to perform the extraction process, thereby selecting the page image that will be processed.

If the selection is a left page image that corresponds to a write pointer 99 of the left image order management table 262L shown in FIG. 10, for example, then as shown in FIG. 15B, the control unit 25 obtains a read pointer (1) of the left image order management table 262L (step S501), selects the page image that corresponds to the write pointer (1) of the left management table 263L of the third level management table 263 linked with the read pointer (1) (step S502), and then expands the selected page image on the display unit 23 (step S503).

Next, when the user confirms the page image displayed on the display unit 23 and touches the coordinate location of the page number, the control unit 25 determines that the area of the page image that has been touched is the extracted area (step S504), extracts the area at the coordinate location of the page number to create an expanded image (thumbnail) of the page number, and then stores the coordinate location of the page number and the expanded image filename of the page number in the page number data that corresponds to the write pointer (1) of the left management table 263L of the third level management table 263 (step S505).

It should be noted that, for sake of simplicity, this area designated by the user is hereinafter also referred to as the "reference area."

Next, the control unit 25, in accordance with this reference area, verifies whether to obtain expanded images (thumbnails) of the page numbers of all the remaining left pages (step S506).

If the user only chooses to acquire the expanded image (thumbnail) of the page number described above, then the process ends as NO in step S506.

On the other hand, if the user chooses to acquire expanded images (thumbnails) of the page numbers from all of the left page images, then the process proceeds to step S507 as YES in step S506.

After proceeding to step S507, the control unit 25 selects the left page image to be processed next, extracts the reference area from the selected page image, creates an expanded image (thumbnail) of the page number, and then stores the reference area (coordinate location of page number) and expanded image (thumbnail) filename of the page number in the corresponding page number data of the left management table 263L of the third level management table 263.

The control unit 25 then determines if all of the left page images have been processed (step S508), and performs step S507 until all of the left page images have been processed. When all of the left page images have been processed (YES in step S508), the series of processes ends.

It should be noted that the above explanation uses a case in which the control unit 25 automatically processes the remaining page images in accordance with the reference area in step S507 (application mode in one aspect of the present invention), but step S507 is not limited to this type of process.

The process in step S507 may designate an area where extraction is desired for each of the page images, for example, and in this case, the process in step S507 should be the same as the processes in steps S501 to S505.

Next, the coordinate location of the page number and the expanded image (thumbnail) of the page number is acquired in a similar manner for the right page image, and this coordinate location of the page number and the expanded image (thumbnail) of the page number are stored in the corresponding page number data of the right management table 263R of the third level management table 263.

The process to acquire the coordinate location of the page number and the expanded image (thumbnail) of the page number from all of the left and right page images thus ends.

(Anticipated Page Numbers)

Next, the setting of the anticipated page numbers, which are page numbers for comparison with the extracted image (thumbnail) of the page number portion, will be explained.

First, the anticipated page numbers are page numbers that should be sequential when the book is put together properly.

Assuming that there are no omissions or overlaps in the page images, for example, if the anticipated page numbers are lined up in the page image order defined in the first level management table 261 of FIG. 10, then when using the 0 to $m^{th}$ numbers on the left, 0 would be the first page, 1 would be the second page, and the final $m^{th}$ should be linked with the page image corresponding to the m+1 page.

This type of ideal page number arrangement is referred to as the anticipated page numbers.

Figure 16:
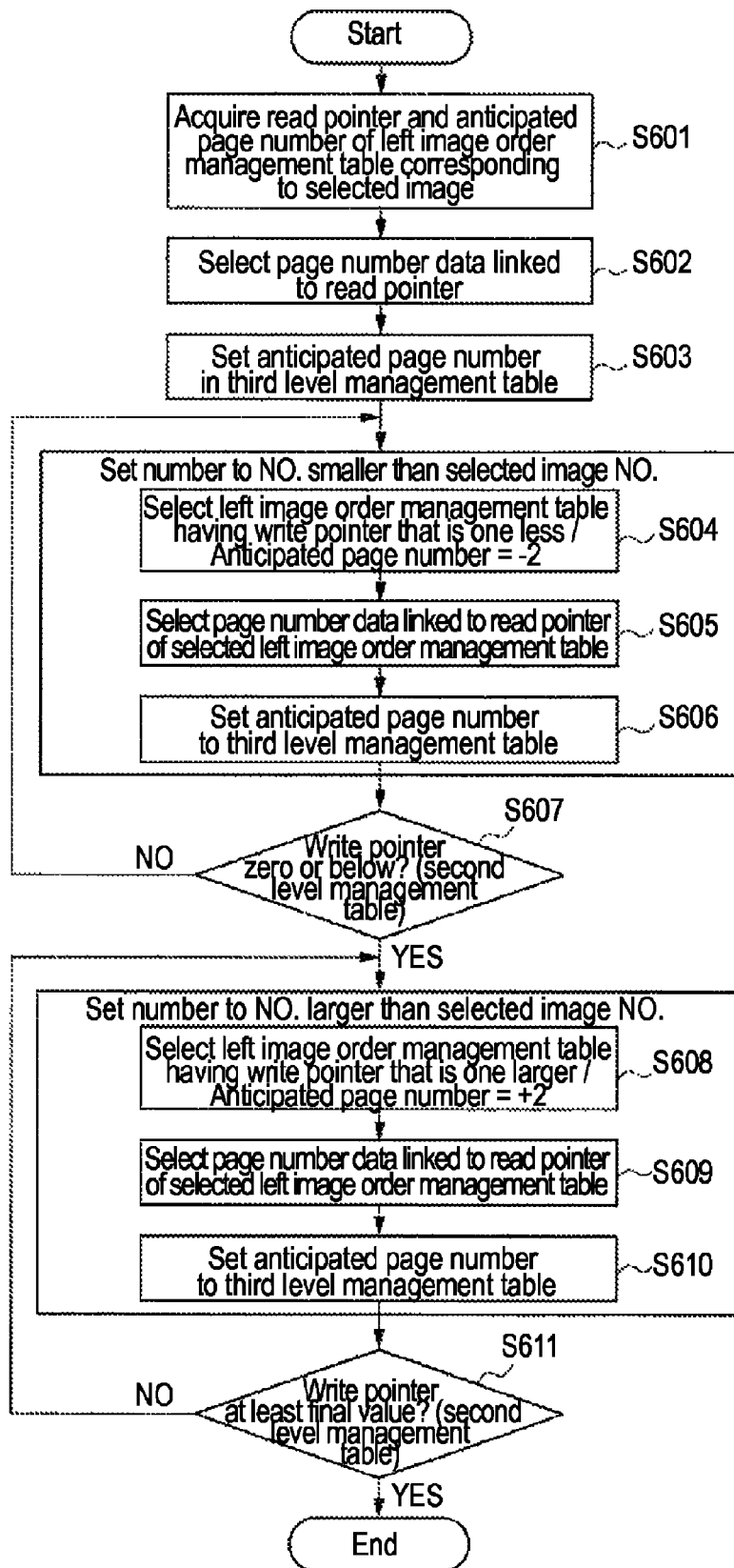
FIG. 16 is a view of the control flow for the anticipated page display function.

In practice, the anticipated page numbers are set by the page number data of the third level management table 263; thus, this setting procedure will be explained below with reference to FIG. 16.

First, because the third level management table 263 is constituted by the left management table 263L that manages the left page images and the right management table 263R that manages the right page images, the process to set these anticipated page numbers is divided into a process for setting the left management table 263L and a process for setting the right management table 263R.

The process for setting the left management table 263L and the process for setting the right management table 263R, however, are fundamentally the same in terms of process content; therefore, the process for setting the anticipated page numbers for the left management table 263L will mainly be described below.

In this example, the third level management table 263 stores page images in ascending order in one of the left management table 263L and the right management table 263R, and the other is stored in descending order, depending on the imaging procedure of the book. In some cases, the retake page images or the like are also stored.

Furthermore, there is also the possibility that the arrangement order of the page images in the third level management table 263 will change due to image insertion, deletion, and the like; therefore, attempting to directly set the anticipated page numbers in the third level management table 263 would complicate the process.

As a countermeasure, setting the anticipated page numbers relative to the second level management table 262, which has a neat ascending order, by skipping a page (odd numbered pages or even numbered pages) makes it possible to efficiently perform this setting, and thus, a specific method for this will be explained below.

First, the user causes the left page images to be displayed on the display unit 23 and selects an appropriate page image therefrom.

The user confirms the page number and the like with the thumbnail for this page image that was created beforehand, for example, and inputs the confirmed page number as the anticipated page number.

The control unit 25 then acquires the read pointer of the left image order management table 262L corresponding to the selected page image and the inputted anticipated page number (step S601).

Next, the control unit 25 selects the page number data of the left management table 263L linked with the acquired read pointer of the left image order management table 262L (step S602) and stores the anticipated page number in this selected page number data (step S603).

The control unit 25 then selects the left image order management table 262L of the write pointer that is one less than before, and updates the anticipated page number with −2 (step S604).

Next, the control unit 25 selects the page number data of the left management table 263L linked with the read pointer of the selected left image order management table 262L (step S605), and then stores the anticipated page number in this selected page number data (step S606).

Next, the control unit 25 determines whether the write pointer of the selected left image order management table 262L is zero or below (step S607) and repeats steps S604 to S606 until the write pointer is zero or below. When the write pointer becomes zero or below (YES in step S607), the control unit 25 returns the anticipated page number to the anticipated page number that the user input beforehand, and proceeds to step S608 with the left image order management table 262L corresponding to the page image that the user previously selected.

In step S608, the control unit 25 updates the anticipated page number with +2, and selects the left image order management table 262L that has a write pointer that is +1 more than the selected left image order management table 262L.

Next, the control unit 25 selects the page number data of the left management table 263L linked with the selected read pointer of the left image order management table 262L (step S609) and stores the anticipated page number in this selected page number data (step S610).

The control unit 25 then determines whether the write pointer of the selected left image order management table 262L is at least the final value (step S611), and repeats steps S608 to S610 until the write pointer is at least the final value. When the write pointer becomes at least the final value (YES in step S611), the process ends.

The anticipated page numbers are also set in the right management table 263R of the third level management table 263 using the same procedure described above.

This gives anticipated page numbers to all of the page images stored in the third level management table 263 forming a portion of the book.

It should be noted that, in the above example, an anticipated page number creation mode is described whereby, when the anticipated page numbers are set for the left management table 263L and the right management table 263R, the user inputs only one page, and the anticipated page numbers for the remaining page images are set automatically; however, an anticipated page number creation mode whereby the user manually sets each individual anticipated page number is also possible.

The anticipated page numbers set in this manner are set in a sequential ascending order.

If there are overlaps or omissions in the page images, then there will be deviation in the page numbers of the book. In such a case, the anticipated page numbers will not match the page numbers; therefore, checking the anticipated page numbers with the page numbers of the page images makes it possible to find these deviations with ease.

Figure 17:
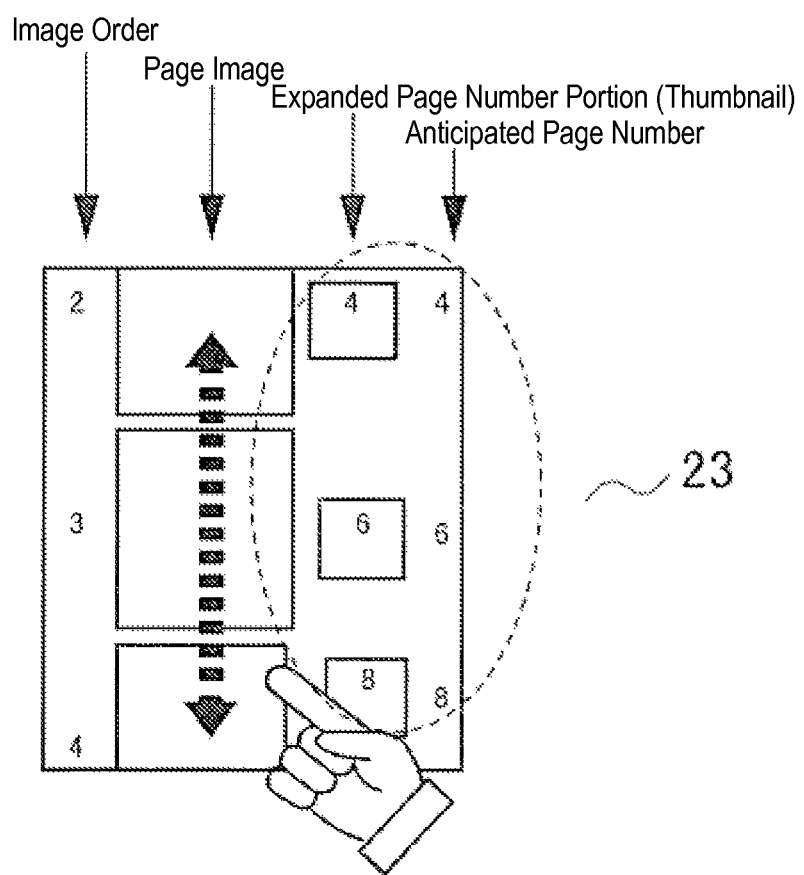
FIG. 17 is a schematic view of a page-order confirmation method displayed on a screen.

FIG. 17 shows a screen display example using the management table 260 described above.

As shown in FIG. 17, the control unit 25 displays the expanded images of the page numbers and the anticipated page numbers described above next to each other on the display unit 23.

In FIG. 17, the following is displayed from the left of the screen of the display unit 23: the image order (image NO.), the page image, the expanded image (thumbnail) of the page number portion, and the anticipated page number.

As shown by the dotted circle in FIG. 17, if the page number expanded in the thumbnail image matches with the anticipated page number shown on the right end of the screen, then it can be easily understood that the page order of the saved page images is correct. Furthermore, both the anticipated page numbers and the thumbnails are large and easy to see, which makes it easy to find pages that have deviations.

As described above, combining the abovementioned methods makes it possible to digitize a book by linking all of the captured images in order. Namely, if the page images are displayed in the order stored in the three-level structure management table 260, the user will be able to read these page images in the same order as a book.

Figure 18A:
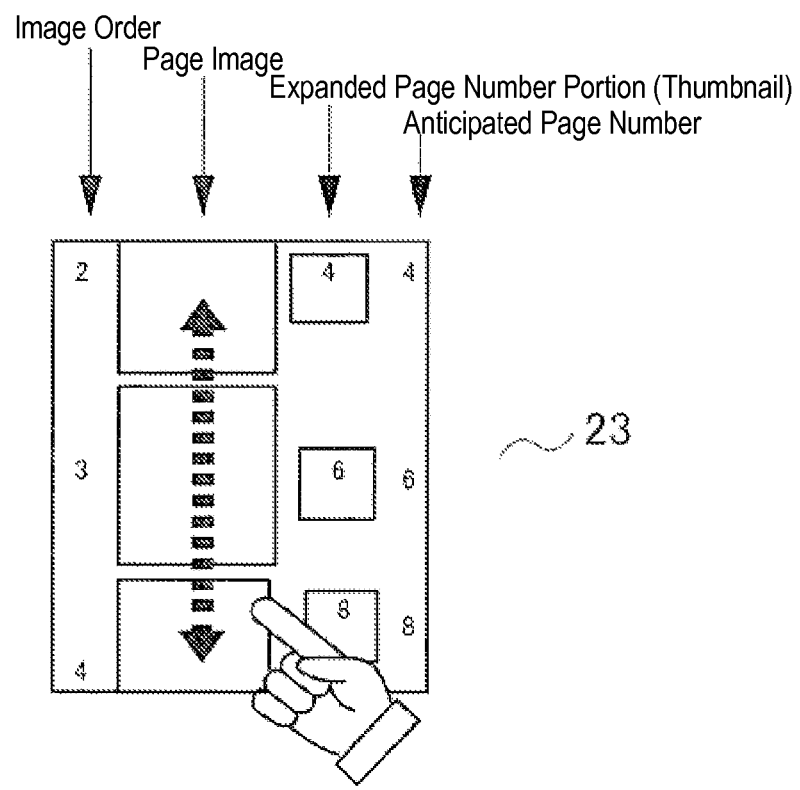
FIGS. 18A and 18B are views showing examples of an image list display.
Figure 18B:
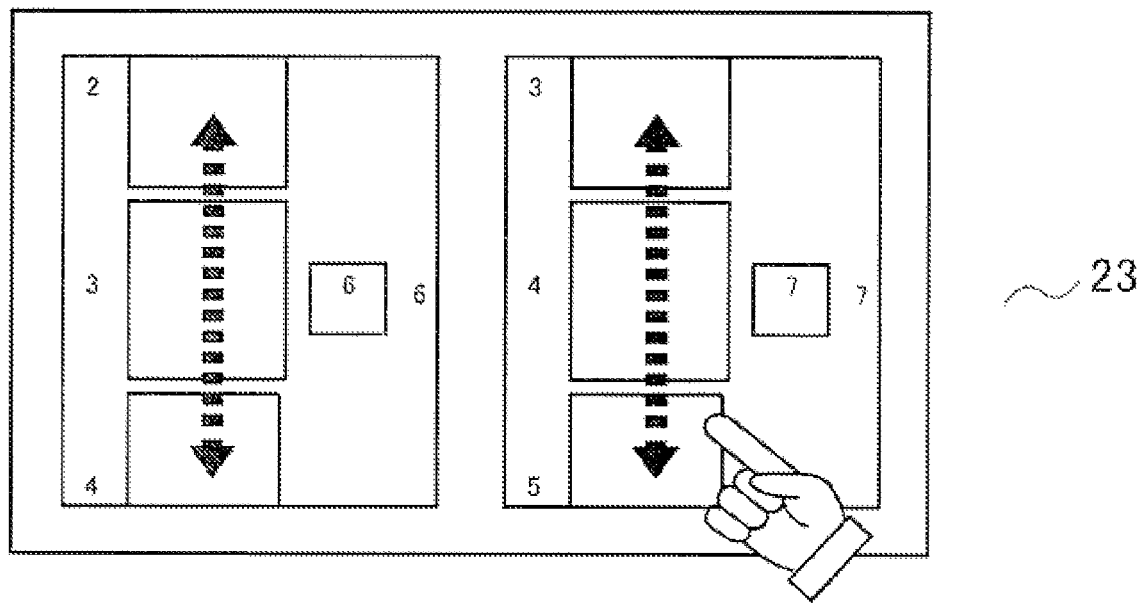

Next, a method of displaying the page image list will be explained. FIGS. 18A and 18B are views showing examples of an image list display.

FIG. 18A shows a display example of a single page, and FIG. 18B shows a display example of a two-page spread.

The display example in FIG. 18A shows the image order (image NO.) on the left end of the screen.

This is the order written to the second level management table 262 (left image order management table 262L, right image order management table 262R). This page image shown by the pointer for the third level management table 263 (left management table 263L, right management table 263R) and written to the second level management table 262 is displayed next to the image NO.

Furthermore, because the extracted image of the page number is also included in this third level management table 263, the extracted image is displayed next to the page image. The anticipated page number is also included in the third level management table 263, and is thus also displayed.

In other words, the control unit 25 refers to the left image order management table 262L or the right image order management table 262R of the second level management table 262 to display left page or right page images on the display unit 23, which will have, from the left of the screen of the display unit 23, the following: the image order (image NO.), the page image, the expanded image (thumbnail) of the page number portion, and the anticipated page number.

It should be noted that FIG. 18B is an example in which a two-page spread referencing the first level management table 261 is shown at the same time, and applies to a case where the screen capacity of the display unit 23 is larger than in FIG. 18A.

For both FIGS. 18A and 18B, the user can verify the previous and subsequent pages by finger scroll operation, and if the anticipated page number is equal to the page number displayed in the thumbnail, then the page order of the saved page image is correct, and if the anticipated page number is different from the page number displayed in the thumbnail, then the page order of the saved page image is incorrect.

Figure 19:
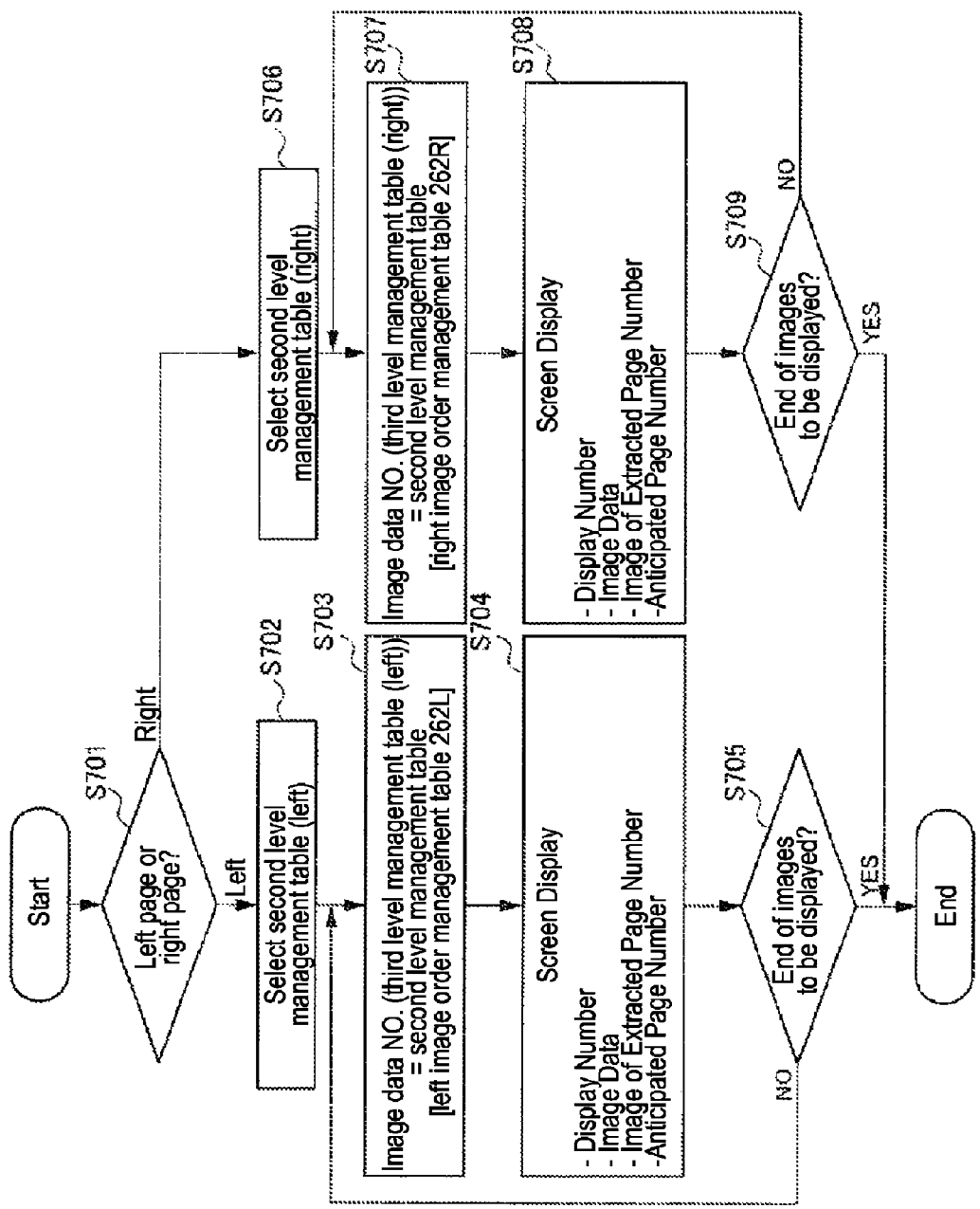
FIG. 19 is a view of the control flow of the image list display function (single page).
Figure 20:
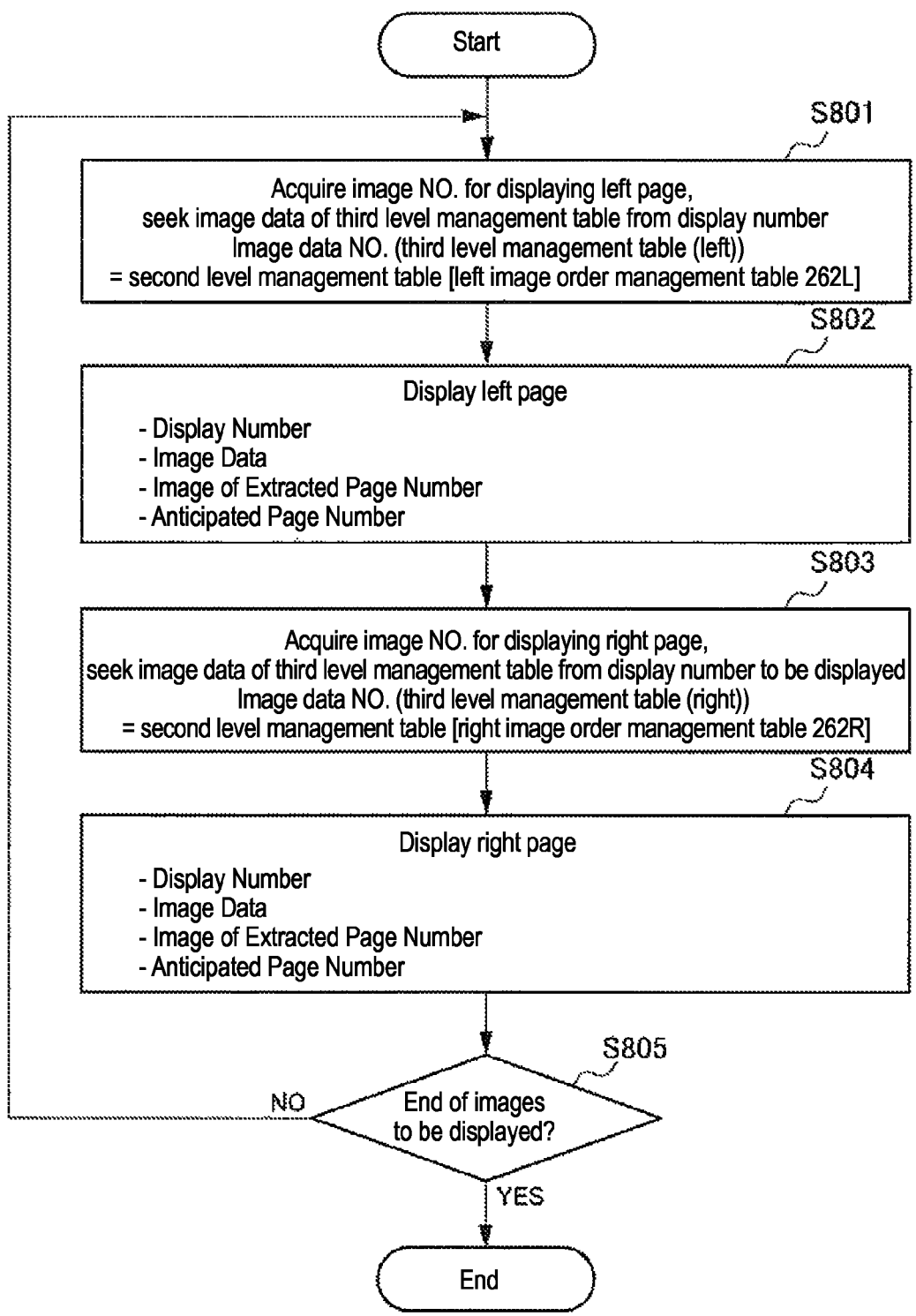
FIG. 20 is a view of the control flow of the image list display function (two pages).

FIG. 19 shows a control flow for the display in FIG. 18A, and FIG. 20 shows a control flow for the display in FIG. 18B.

In FIG. 19, during left page control ("left" in step S701), the control unit 25 selects the left image order management table 262L of the second level management table 262 (step S702), and acquires, from the number (NO.) to be shown on the display unit 23, the page image data written to the third level management table 263 (left management table 263L) (step S703).

In this example, the image data NO. (left management table 263L) is the second level management table 262 (left image order management table 262L).

Next, the control unit 25 displays the image data, extracted image of the page number, and anticipated page number acquired from the display number and third level management table 263 (left management table 263L) on the display unit 23 in order from the left (step S704).

Meanwhile, during right page control ("right" in step S701), the control unit 25 selects the right management table 262R of the second level management table 262 (step S706), and acquires the page image data written to the third level management table 263 (right management table 263R) from the NO. that is to be displayed on the display unit 23 (step S707).

In this example, the image data NO. (right management table 263R) is the second level management table 262 (right image order management table 262R).

Next, the control unit 25 displays the image data, extracted image of the page number, and anticipated page number acquired from the display number and third level management table 263 (left management table 263L) on the display unit 23 from the left (step S708).

The left page control (steps S702 to S704) and the right page control (steps S706 to S708) described above are both repeated until there are no images to be displayed (YES in step S705, YES in step S709).

In FIG. 20, the control unit 25 first acquires the image NO. for displaying the left page, and seeks the image data of the third level management table 263 (left management table 263L) from the image NO. (step S801).

In this example, the image data NO. (left management table 263L) is the second level management table 262 (left image order management table 262L).

The control unit 25 then displays the image data, extracted image of the page number, and anticipated page number acquired from the display number and third level management table 263 (left management table 263L) on the display unit 23 in the stated order (step S802).

Next, the control unit 25 acquires the image NO. for displaying the right page, and seeks the image data of the third level management table 263 (right management table 263R) from the image NO. (step S803).

In this example, the image data NO. (right management table 263R) is the second level management table 262 (right image order management table 262R).

The control unit 25 then displays the image data, extracted image of the page number, and anticipated page number acquired from the display number and third level management table 263 (right management table 263R) on the display unit 23 in the stated order, which at this time is displayed along with the left page in a two-page spread (step S804).

The above operations are repeated until there are no images to be displayed (YES in step S805).

Effects of Embodiments

As described above, according to the imaging device (tablet 2) of the present embodiment, the control unit 25 causes the imaging unit 21 to capture a page image in accordance with a "left page imaging mode" in which left page images are sequentially imaged following the pages turning, and a "right page imaging mode" in which the right page images are sequentially imaged following the pages turning, with both modes being selectable via the operation unit 22. By having the page images that are captured by the imaging unit 21 output to an output unit (display unit 23, communication unit 24, or storage unit 26), it is possible for the page turning device 3 to turn the pages; for an accurate imaging operation to be performed in conjunction with this page turning; and for a book to be digitized with ease, for example.

In other words, controlling the page turning device 3 and the tablet 2 in conjunction with each other makes it possible to provide a document camera system that has an imaging device (tablet) and with which a series of operations from imaging to editing and viewing can be performed with ease.

Specifically, it is possible to capture a page image using the tablet 2 when the page turning device 3 turns a middle page of the book; thus, it is possible to have efficient imaging that automatically continues in a sequential order except for the front cover-adjacent pages and the back cover-adjacent pages. Furthermore, by storing the page images captured by the imaging in the storage unit 26, the book can be converted into easily editable and processable digital data.

Moreover, when the page imaging selected via the operation unit 22 is performed in a left page manual imaging mode, the control unit 25 sets the captured page images as left page images, and when the page imaging selected via the operation unit 22 is performed in a right page manual imaging mode, the control unit sets the captured images as right page images. This makes it possible to manage data independent of the page turning device 3 by distinguishing whether the front cover, back cover, or retake page images are left page images or right page images; therefore, it is possible to perform very smooth editing in order to digitize the book.

The page images acquired by the imaging are edited by using the three-level structure management table 260. This allows easy insertion, deletion, switching, image data sorting (descending order to ascending order), and the like of the page images without copy operation, which makes high-speed editing possible.

By having the three-level structure management table 260, it is possible to digitize various types of books by changing the links with the read pointers and the like among the respective management tables without changing the actual table structure.

If there is a book with only one side, for example, the three-level structure management table can be compatible with this by only the table linked with the image data in either the left image order management table 262L or the right image order management table 262R of the second level management table 262 being linked with the first level management table 261.

It should be noted that, at this time, the management table 260 to be created includes: the third level management table 263, which is constituted by the left management table 263L that manages the left page images and the right management table 263R that manages the right page images; the second level management table 262, which is constituted by the left image order management table 262L that is linked with the left management table 263L and that manages the order of the left page images, and the right image order management table 262R that is linked with the right management table 263R and that manages the order of the right page images; and the first level management table 261, which is linked with the second level management table 262 and which manages the order of the left page images and the right page images when these page images are combined together.

The imaging device of the present embodiment makes it possible to add additional information to the three-level structure management table 260 with ease; for example, it is easy to verify page order by extracting and displaying the page number portions from the captured page images. Furthermore, by adding anticipated page numbers and displaying these next to the extracted images of the page numbers, it is possible to easily verify the page order and provide convenience to the user.

Specifically, by displaying the page image, extracted image of the page number that has been expanded, and anticipated page number next to each other, it is possible to verify easily whether the extracted image of the page number and the anticipated page number match each other.

By providing modes whereby one page or both pages are displayed, and a selectable environment depending on the display capacity of the imaging device, verification can be made even easier and more visible.

An example was shown in which only the tablet 2 is the imaging device according to one aspect of the present invention, but the imaging device is not limited to this, and can be applied to all electronic devices that are easy to use and circulating on the market, such as smartphones or the like, which have imaging, recording, and editing functions.

An embodiment of the present invention has been described above, but it is apparent that the technical scope of the present invention is not limited to the scope described in the embodiment above.

It is apparent to a person skilled in the art that various changes and modifications can be made to the embodiments above. It is also apparent from the description of claims that embodiments with such changes and modifications are also included in the technical scope of the present invention.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An imaging device, comprising:
    an imaging unit that captures page images;
    an operation unit configured to receives a command from outside to select a left page imaging mode whereby left page images among said page images are sequentially captured in accordance with page turning, and a command from outside to select a right page imaging mode whereby right page images among said page images are sequentially captured in accordance with page turning;
    a control unit that causes the imaging unit to perform imaging of the page images that correspond to the imaging mode selected via the operation unit; and
    an output unit that outputs the page images captured by the imaging unit,
    wherein the operation unit is configured to receive, from outside, a command that designates an area that contains an image of a page number in one of the left and right page images, and
    wherein the control unit extracts an image of said area that contains the page number and creates a thumbnail of said extracted image.

2. The imaging device according to claim 1,
    wherein the operation unit is configured to receive a command from outside to select a left page manual imaging mode whereby the left page images are manually imaged and a command from outside to select a right page manual imaging mode whereby the right page images are manually imaged, and
    wherein the control unit assigns the page images captured during the left page manual imaging mode as left page images, and assigns the page images captured during the right page manual imaging mode as right page images.

3. The imaging device according to claim 1, wherein the operation unit is configured to receive data representing a page number of one of the left and right page images from outside.

4. The imaging device according to claim 3, wherein the control unit assigns anticipated page numbers to the remaining left or right page images in accordance with the page number received from the outside.

5. The imaging device according to claim 4, wherein the output unit outputs the page images and the anticipated page numbers.

6. The imaging device according to claim 1,
    wherein the operation unit is configured to receive a left page image inversion command whereby a vertical relationship of the left page images is inverted, and a right page image inversion command whereby a vertical relationship of the right page images is inverted, and
    wherein the control unit inverts the vertical relationship of the left or right page images in accordance with the received left or right page image inversion command.

7. The imaging device according to claim 1,
    wherein the control unit designates, in all remaining left or right page images, an area that is located at the same location as said area as an area including an image of a corresponding page number, and
    wherein the control unit creates thumbnails for the areas designated for all the remaining left or right page images.

8. The imaging device according to claim 1, wherein the output unit outputs the page images and the thumbnails.

9. The imaging device according to claim 1,
    wherein the operation unit is configured to receive an image insertion command from outside to select one of the page images and replace said one of the page images with a different one of the page images, and the operation unit is further configured to receive an image deletion command from outside to select one of the page images and delete said one of the page images, and
    wherein the control unit performs a corresponding insertion process or deletion process designated by the image insertion or deletion command.

10. An imaging device comprising:
    an imaging unit that captures page images;
    an operation unit configured to receives a command from outside to select a left page imaging mode whereby left page images among said page images are sequentially captured in accordance with page turning, and a command from outside to select a right page imaging mode whereby right page images among said page images are sequentially captured in accordance with page turning;
    a control unit that causes the imaging unit to perform imaging of the page images that correspond to the imaging mode selected via the operation unit;
    a third level management table formed by a left management table that manages at least the left page images, and a right management table that manages at least the right page images;
    a second level management table formed by a left image order management table that is linked with the left management table and that manages an order of the left page images, and a right image order management table that is linked with the right management table and that manages an order of the right page images;
    a first level management table that is linked with the second level management table and that manages an order of the left page images and the right page images when these page images are combined together; and an output unit that outputs the page images captured by the imaging unit based on the first level management table, the second level management table, and the third level management table.

11. A method of imaging pages of a book, comprising:
receiving, by an operation unit, a command from outside to select a left page imaging mode whereby left page images among page images are sequentially captured in accordance with page turning, or a command from outside to select a right page imaging mode whereby right page images among said page images are sequentially captured in accordance with page turning;
causing, by a control unit, an imaging unit to perform imaging of the page images that correspond to the imaging mode selected via the operation unit;
receiving, by the operation unit, a command from outside to designates an area that contains an image of a page number in one of the left and right page images;
extracting, by the control unit, an image of said area that contains the page number and creating a thumbnail of said extracted image; and
outputting the page images captured by the imaging unit and the corresponding thumbnail.

\* \* \* \* \*